United States Patent
Clark et al.

(10) Patent No.: US 11,270,355 B2
(45) Date of Patent: Mar. 8, 2022

(54) SYSTEMS AND METHODS FOR DYNAMIC MESSAGING CAMPAIGN

(71) Applicant: Shopify Inc., Ottawa (CA)

(72) Inventors: Kevin Clark, Terrebonne (CA); Brooke Fitzgerald, Montreal (CA); David Cornu, Montreal (CA); Jacinthe Ricard, Montreal (CA); Mathieu Leduc-Hamel, Montreal (CA)

(73) Assignee: SHOPIFY INC., Ottawa (CA)

( * ) Notice: Subject to any disclaimer, the term of this patent is extended or adjusted under 35 U.S.C. 154(b) by 0 days.

(21) Appl. No.: 16/780,410

(22) Filed: Feb. 3, 2020

(65) Prior Publication Data

US 2021/0241325 A1 Aug. 5, 2021

(51) Int. Cl.
*G06Q 30/00* (2012.01)
*G06Q 30/02* (2012.01)
*G06Q 10/10* (2012.01)

(52) U.S. Cl.
CPC ....... *G06Q 30/0277* (2013.01); *G06Q 10/107* (2013.01); *G06Q 30/0256* (2013.01)

(58) Field of Classification Search
CPC .................................................. G06Q 10/107
See application file for complete search history.

(56) References Cited

U.S. PATENT DOCUMENTS

| | | |
|---|---|---|
| 951,993 A | 3/1910 | Lowry et al. |
| 9,519,938 B2 | 12/2016 | Spiegel |
| 2009/0265220 A1 | 10/2009 | Bayraktar |
| 2009/0282002 A1 | 11/2009 | Reeder |
| 2012/0089455 A1 | 4/2012 | Belani |
| 2013/0035985 A1 | 2/2013 | Gilbert |
| 2014/0324537 A1* | 10/2014 | Gilbert ............... G06Q 30/0201 705/7.31 |
| 2016/0063538 A1 | 3/2016 | Srivastava |
| 2016/0132926 A1 | 5/2016 | Zimmerman |
| 2016/0373513 A1* | 12/2016 | Kim .................. G06Q 30/0277 |
| 2018/0219830 A1* | 8/2018 | O'Brien ............. G06Q 30/0248 |
| 2019/0073698 A1 | 3/2019 | Pearson |
| 2021/0035166 A1 | 2/2021 | Doumar |

OTHER PUBLICATIONS

USPTO, Office Action for U.S. Appl. No. 16/780,484 dated Dec. 31, 2020.
USPTO, Office Action for U.S. Appl. No. 16/780,484 dated Feb. 12, 2021.
USPTO, Office Action for U.S. Appl. No. 16/780,484 dated May 13, 2021.
USPTO, Office Action for U.S. Appl. No. 16/780,484 dated Aug. 6, 2021.

* cited by examiner

*Primary Examiner* — Alvin L Brown
(74) *Attorney, Agent, or Firm* — Ridout & Maybee LLP

(57) ABSTRACT

Methods and systems for generating a messaging campaign are described. A first phase of the campaign is conducted using a first set of parameters for delivering a first message to a first group of intended recipients via a first distribution channel. Based on analysis of online activity associated with one or more members of the first group, a second set of parameters is determined for a second phase of the messaging campaign. The second set of parameters define a change to the first set of parameters.

18 Claims, 11 Drawing Sheets

FIG. 2

SYSTEMS AND METHODS FOR DYNAMIC MESSAGING CAMPAIGN

FIELD

The present disclosure relates to methods and systems for generating messaging campaigns, including messaging campaigns related to e-commerce.

BACKGROUND

Marketers and merchants often use messaging campaigns to communicate certain message contents to a desired demographic. For stores having an online presence (e.g., an e-commerce store), such messaging campaigns often include messages sent via electronic channels, such as via email or social media.

Conventional techniques for generating and managing messaging campaigns (e.g., email marketing campaigns) have limited flexibility. For example, a conventional messaging campaign typically relies on the initiator of the campaign (e.g., the human marketer or merchant) to define the parameters of the messaging campaign (e.g., the intended recipients, the message content, and the distribution channel). Once defined, the messaging campaign is carried out accordingly. However, reliance on the human initiator to define the parameters of the campaign can result in the same parameters being used over and over again, due to human habit, or can result in selected parameters that do not align well with each other or with the preferences of the intended recipients.

It would be useful to provide a more dynamic way to generate and carry out a messaging campaign, which may help to avoid over-reliance on human-submitted campaign parameters.

SUMMARY

The present disclosure describes various examples which may enable more dynamic generation of messaging campaigns. In some examples, a set of recommended parameters for a messaging campaign may be automatically generated, based on a set of default parameters and/or user-submitted parameters. Different sub-groups may be identified within a group of intended recipients, and different recommended campaign parameters may be automatically generated to better direct the campaign towards the different sub-groups.

In some examples, the parameters of the messaging campaign can be dynamically adjusted throughout the timeline of the campaign. For example, depending on how different recipients respond to a first phase of the campaign, the recommended parameters for carrying out a second phase of the campaign may be automatically and dynamically adjusted.

The examples described herein may be implemented in the context of an e-commerce platform, or may be made available for use outside of the e-commerce platform.

Some examples described herein may be described in the context of email communications. However, it should be understood that different forms of electronic communications (e.g., email, text messaging, social media private or public messages, etc.) may be within the scope of the present disclosure.

The examples described herein may be applicable to messaging campaigns in a variety of contexts, including for messaging campaigns related to marketing for e-commerce (e.g., for stores and/or merchants having an online presence).

In some examples, the present disclosure describes a system including a processor in communication with a storage. The processor is configured to execute instructions in the storage to cause the system to: conduct at least a first phase of a messaging campaign, the first phase including a first set of parameters for delivering a first message to at least a first group of intended recipients, the first set of parameters defining at least the first group and a respective first distribution channel; determine, based on analysis of online activity associated with one or more members of the first group, the online activity being associated with a store, a second set of parameters for a second phase of the messaging campaign, the second set of parameters defining a change to the first set of parameters for delivering a second message to the one or more members; and generate a recommendation to conduct the second phase of the messaging campaign for the one or more members using the second set of parameters.

In some examples, the present disclosure describes a method including: conducting at least a first phase of a messaging campaign, the first phase including a first set of parameters for delivering a first message to at least a first group of intended recipients, the first set of parameters defining at least the first group and a respective first distribution channel; determining, based on analysis of online activity associated with one or more members of the first group, the online activity being associated with a store, a second set of parameters for a second phase of the messaging campaign, the second set of parameters defining a change to the first set of parameters for delivering a second message to the one or more members; and generating a recommendation to conduct the second phase of the messaging campaign for the one or more members using the second set of parameters.

In some examples, the present disclosure describes a computer readable medium having computer-executable instructions stored thereon. The instructions, when executed by a processor of a system, causes the system to: conduct at least a first phase of a messaging campaign, the first phase including a first set of parameters for delivering a first message to at least a first group of intended recipients, the first set of parameters defining at least the first group and a respective first distribution channel; determine, based on analysis of online activity associated with one or more members of the first group, the online activity being associated with a store, a second set of parameters for a second phase of the messaging campaign, the second set of parameters defining a change to the first set of parameters for delivering a second message to the one or more members; and generate a recommendation to conduct the second phase of the messaging campaign for the one or more members using the second set of parameters.

In any of the above examples, the analysis of the online activity may include analysis of at least one of: online activity associated with a first store associated with the messaging campaign, or online activity associated with a second store not associated with the messaging campaign.

In any of the above examples, the online activity may be associated with a purchase of a first offering associated with the messaging campaign.

In any of the above examples, the second set of parameters may be determined to suppress promotion of the first offering to the one or more members in the second phase of the messaging campaign.

In any of the above examples, determine the second set of parameters may be determined to promote a second offering, that is related to the first offering, to the one or more members in the second phase of the messaging campaign.

In any of the above examples, the one or more members may define a subgroup of the first group. The second phase of the messaging campaign may be conducted according to the second set of parameters for the subgroup; and The first phase of the messaging campaign may continue to be conducted according to the first set of parameters for a remainder of the first group.

In any of the above examples, the one or more members may define a subgroup of the first group. The second phase of the messaging campaign may be conducted for the subgroup, according to the second set of parameters; and the second phase of the messaging campaign may be conducted for a remainder of the first group according to a third set of parameters.

In any of the above examples, the second set of parameters may be defined for conducting the messaging campaign to a second group of intended recipients. The one or more members may be reassigned to the second group.

In any of the above examples, the online activity may include at least one of: a page view event; a purchase transaction event; an offering search event; or a product review event.

In any of the above examples, the change defined by the second set of parameters may include at least one of: a change in distribution channel; a change in message content; a change in message timing; a change in number of messages; or a change in incentive.

In any of the above examples, the online activity may be associated with a second distribution channel; and the second set of parameters may be determined to deliver the second message using the second distribution channel.

In any of the above examples, the recommendation may be automatically implemented to conduct the second phase of the messaging campaign for the one or more members using the second set of parameters.

BRIEF DESCRIPTION OF THE DRAWINGS

Reference will now be made, by way of example, to the accompanying drawings which show example embodiments of the present application, and in which:

FIG. 2 is an example homepage of an administrator, which may be accessed via the e-commerce platform of FIG. 1;

Similar reference numerals may have been used in different figures to denote similar components.

DESCRIPTION OF EXAMPLE EMBODIMENTS

The present disclosure will be described in the context of an e-commerce platform, discussed below. However, it should be understood that this discussion is only for the purpose of illustration and is not intended to be limiting. Further, it should be understood that the present disclosure may be implemented in other contexts, and is not necessarily limited to implementation in an e-commerce platform.

Figure 1:
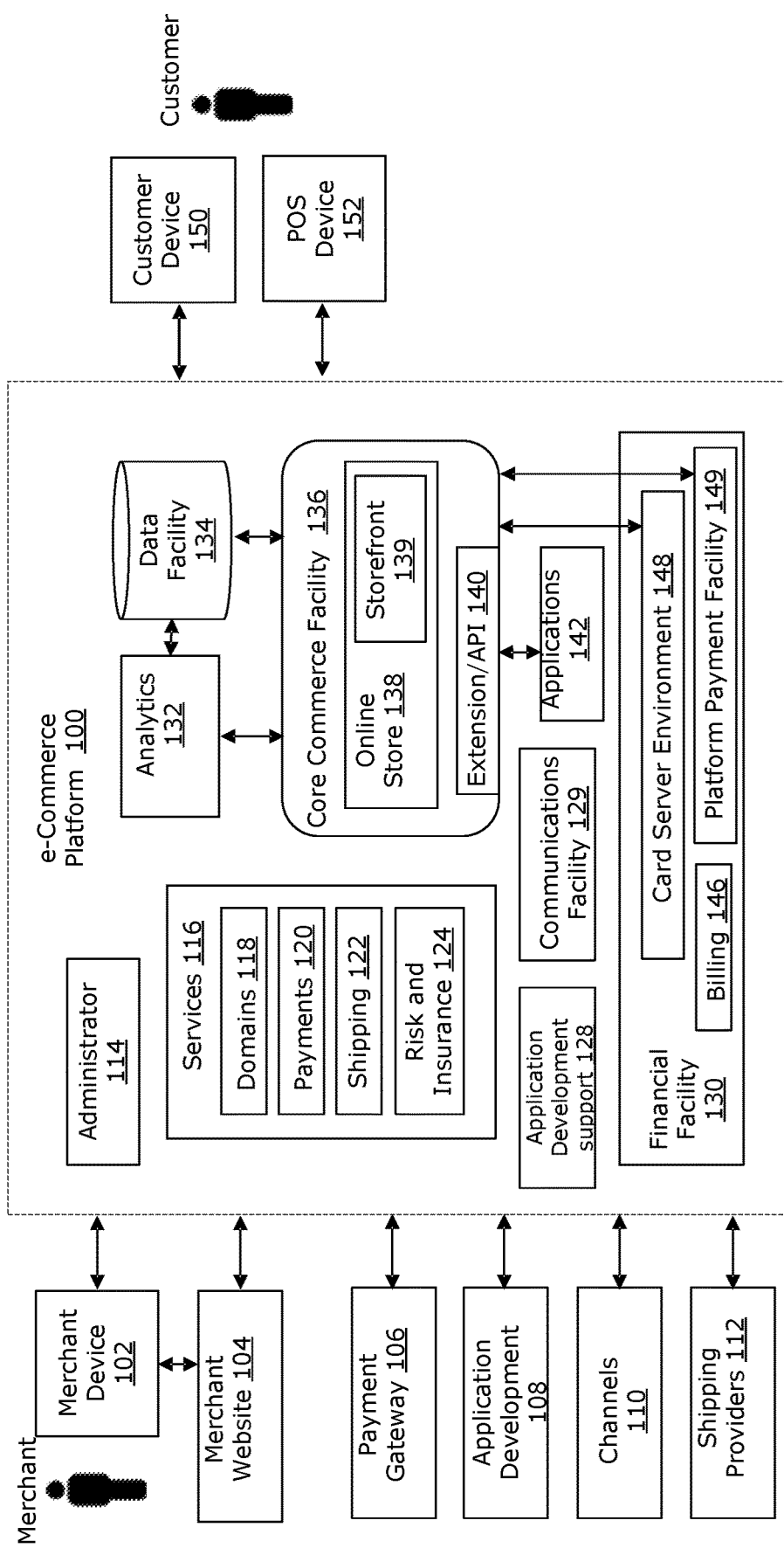
FIG. 1 is a block diagram of an example e-commerce platform, in which examples described herein may be implemented.

With reference to FIG. 1, an embodiment e-commerce platform 100 is depicted for providing merchant products and services to customers. While the disclosure throughout contemplates using the apparatus, system, and process disclosed to purchase products and services, for simplicity the description herein will refer to products or offerings. All references to products or offerings throughout this disclosure should also be understood to be references to products and/or services, including physical products, digital content, tickets, subscriptions, services to be provided, and the like.

While the disclosure throughout contemplates that a "merchant", a "marketer" and a "customer" may be more than individuals, for simplicity the description herein may generally refer to merchants, marketers and customers as such. All references to merchants, marketers and customers throughout this disclosure should also be understood to be references to groups of individuals, companies, corporations, computing entities, and the like, and may represent for-profit or not-for-profit exchange of products. Further, while the disclosure throughout refers to "merchants", "marketers" and "customers", and describes their roles as such, it should be understood that aspects of the e-commerce platform 100 may be more generally available to support users in an e-commerce environment, and all references to merchants, marketers and customers throughout this disclosure should also be understood to be references to users, such as where a user is a merchant-user (e.g., a seller, retailer, wholesaler, or provider of products), a marketer-user (e.g., a marketing agent, an external marketing service provider, or a self-marketing merchant), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Further, it should be understood that any individual or group of individuals may play more than one role and may fit more than one label in the e-commerce environment. For example, a merchant may also be a marketer, or a corporate user may also be a customer.

The e-commerce platform 100 may provide a centralized system for providing merchants with online resources for managing their business. Merchants may utilize the e-commerce platform 100 for managing commerce with customers, such as by implementing an e-commerce experience with customers through an online store 138, through channels 110, through point of sale (POS) devices 152 in physical locations (e.g., a physical storefront or other location such as through a kiosk, terminal, reader, printer, 3D printer, and the like), by managing their business through the e-commerce platform 100, by interacting with customers through a communications facility 129 of the e-commerce platform 100, or any combination thereof.

The online store 138 may represent a multitenant facility comprising a plurality of virtual storefronts 139. In various embodiments, merchants may manage one or more storefronts 139 in the online store 138, such as through a merchant device 102 (e.g., computer, laptop computer, mobile computing device, and the like), and offer products to customers through a number of different channels 110 (e.g., an online store 138; a physical storefront through a POS device 152; electronic marketplace, through an electronic buy button integrated into a website or social media channel such as on a social network, social media page, social media messaging system; and the like). A merchant may sell across channels 110 and then manage their sales through the e-commerce platform 100. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront 139 through the online store 138, and utilizing the communications facility 129 to leverage customer interactions and analytics 132 to improve the probability of sales, for example.

In various embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication, and the like, providing a system for reaching customers and facilitating merchant services for the real or virtual pathways available for reaching and interacting with customers.

In various embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application development 108, channels 110, shipping providers 112, customer devices 150, POS devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a thin client via a web browser, accessed through by POS devices, and the like). In various embodiments, elements of the e-commerce platform 100 may be implemented to operate on various platforms and operating systems, such as iOS, Android, over the internet, and the like.

In various embodiments, storefronts 139 may be served by the e-commerce platform 100 to customers (e.g., via customer devices 150), where customers can browse and purchase the various products available (e.g., add them to a cart, purchase immediately through a buy-button, and the like). Storefronts 139 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their storefront 139. Merchants may customize the look and feel of their website through a theme system, such as where merchants can select and change the look and feel of their storefront 139 by changing their theme while having the same underlying product and business data shown within the storefront's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a basic content management system for website content. Merchants may author blog posts or static pages and publish them to their storefront 139 and/or website 104, such as through blogs, articles, and the like, as well as configure navigation menus. Merchants may upload images (e.g., for products), video, content, data, and the like to the e-commerce platform 100, such as for storage by the system. In various embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110, including the online store 138, over the telephone, as well as through physical POS devices 152 as described herein. The e-commerce platform 100 may provide business support services 116, an administrator component 114, and the like associated with running an on-line business, such as providing a domain service 118 associated with their online store, payments services 120 for facilitating transactions with a customer, shipping services 122 for providing customer shipping options for purchased products, risk and insurance services 124 associated with product protection and liability, merchant billing services 146, and the like. Services 116 may be provided via the e-commerce platform 100 or in association with external facilities, such as through a payment gateway 106 for payment processing, shipping providers 112 for expediting the shipment of products, and the like.

In various embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

Figure 2:
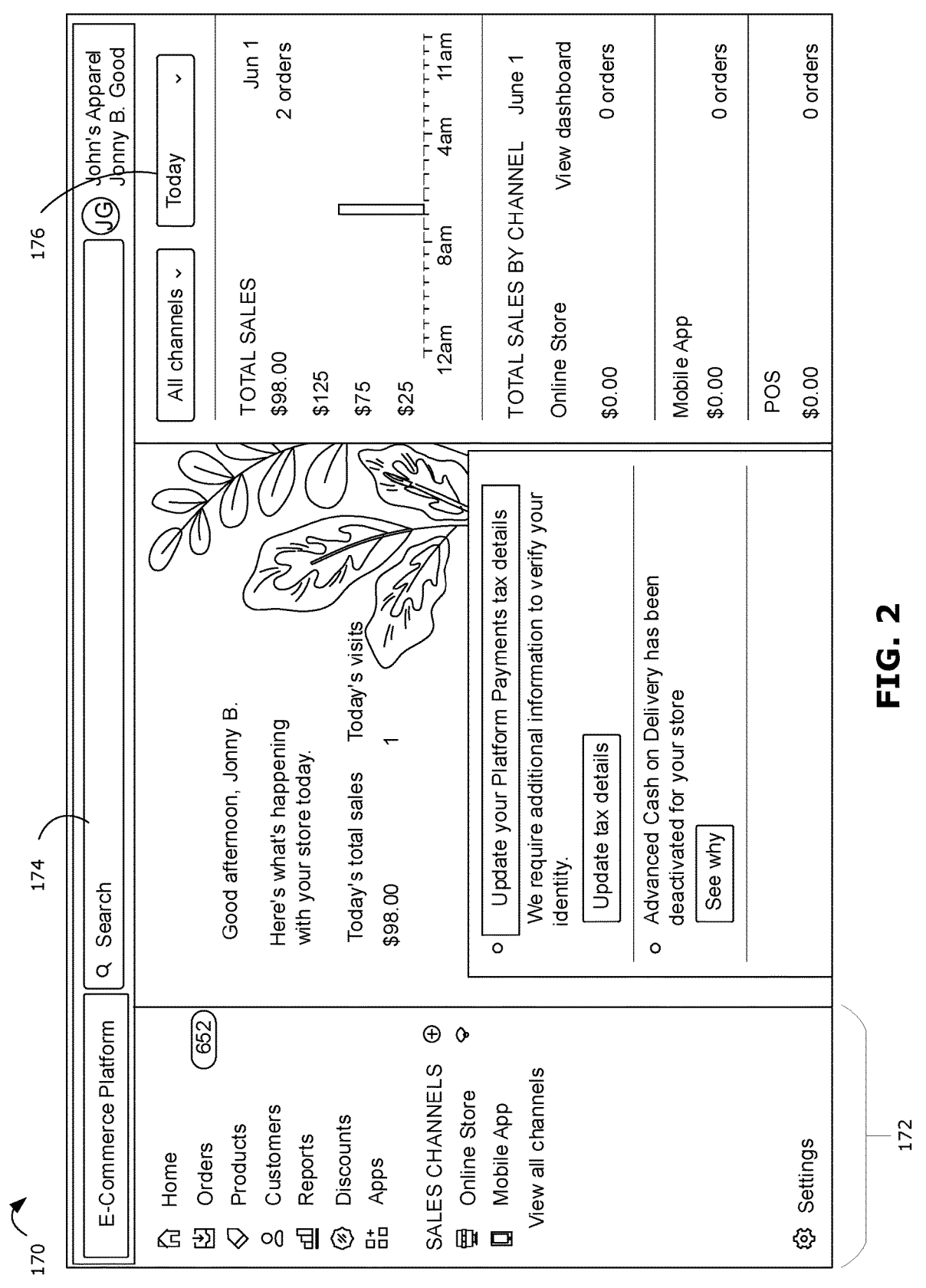

FIG. 2 depicts a non-limiting embodiment for a home page 170 of an administrator 114, which may show information about daily tasks, a store's recent activity, and the next steps a merchant can take to build their business. In various embodiments, a merchant may log in to administrator 114, such as from a browser or mobile device, and manage aspects of their storefront, such as viewing the storefront's recent activity, updating the storefront's catalog, managing orders, recent visits activity, total orders activity, and the like. In various embodiments, the merchant may be able to access the different sections of administrator 114 by using the sidebar 172, such as shown on FIG. 2. Sections of the administrator may include core aspects of a merchant's business, including orders, products, and customers; sales channels, including the online store, POS, and buy button; applications installed on the merchant's account; settings applied to a merchant's storefront 139 and account. A merchant may use a search bar 174 to find products, pages, or other information. Depending on the device the merchant is using, they may be enabled for different functionality through the administrator 114. For instance, if a merchant logs in to the administrator 114 from a browser, they may be able to manage all aspects of their storefront 139. If the merchant logs in from their mobile device, they may be able to view all or a subset of the aspects of their storefront 139, such as viewing the storefront's recent activity, updating the storefront's catalog, managing orders, and the like.

More detailed information about commerce and visitors to a merchant's storefront 139 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110 from different periods of time (e.g., days, weeks, months, and the like), such as by using drop-down menus 176. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's storefront 139, such as based on account status, growth, recent customer activity, and the like. Notifications may be provided to assist a merchant with navigating through a process, such as capturing a payment, marking an order as fulfilled, archiving an order that is complete, and the like.

Reference is made back to FIG. 1. The e-commerce platform may provide for a communications facility 129 and associated merchant interface for providing electronic communications and marketing, such as utilizing an electronic messaging aggregation facility (not shown) for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 130 for secure financial transactions with customers, such as through a secure card server environment 148. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's back account (e.g., when using capital), and the like. These systems may have Sarbanes-Oxley Act (SOX) compliance and a high level of diligence required in their development and operation. The financial facility 130 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In various embodiments, online store 138 may support a great number of independently administered storefronts 139 and process a large volume of transactional data on a daily basis for a variety of products. Transactional data may include customer contact information, billing information, shipping information, information on products purchased, information on services rendered, and any other information associated with business through the e-commerce platform 100. In various embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

In various embodiments, the e-commerce platform 100 may be configured with a core commerce facility 136 for content management and task automation to enable support and services to the plurality of storefronts 139 (e.g., related to products, inventory, customers, orders, collaboration, suppliers, reports, financials, risk and fraud, and the like), but be extensible through applications 142 that enable greater flexibility and custom processes required for accommodating an ever-growing variety of merchant storefronts 139, POS devices 152, products, and services. For instance, the core commerce facility 136 may be configured for flexibility and scalability through portioning (e.g., sharding) of functions and data, such as by customer identifier, order identifier, storefront identifier, and the like. The core commerce facility 136 may accommodate store-specific business logic and a web administrator. The online store 138 may represent a channel, be embedded within the core commerce facility 136, provide a set of support and debug tools that support uses for merchants, and the like. The core commerce facility 136 may provide centralized management of critical data for storefronts 139.

The core commerce facility 136 includes base or "core" functions of the e-commerce platform 100, and as such, as described herein, not all functions supporting storefronts 139 may be appropriate for inclusion. For instance, functions for inclusion into the core commerce facility 136 may need to exceed a core functionality threshold through which it may be determined that the function is core to a commerce experience (e.g., common to a majority of storefront activity, such as across channels, administrator interfaces, merchant locations, industries, product types, and the like), is re-usable across storefronts (e.g., functions that can be re-used/modified across core functions), limited to the context of a single storefront at a time (e.g., implementing a storefront 'isolation principle', where code should not be able to interact with multiple storefronts at a time, ensuring that storefronts cannot access each other's data), provide a transactional workload, and the like. Maintaining control of what functions are implemented may enable the core commerce facility 136 to remain responsive, as many required features are either served directly by the core commerce facility 136 or enabled by its extension/application programming interface (API) 140 connection to applications 142. If care is not given to restricting functionality in the core commerce facility 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the core commerce facility 136 may be configured to maintain responsiveness, such as through configuration that utilizes timeouts, queues, back-pressure to prevent degradation, and the like.

Although isolating storefront data is important to maintaining data privacy between storefronts 139 and merchants, there may be reasons for collecting and using cross-store data, such as for example, with an order risk assessment system or a platform payment facility, both of which require information from a majority of storefronts 139 to perform well. In various embodiments, rather than violating the isolation principle, it may be preferred to move these components out of the core commerce facility 136 and into their own infrastructure within the e-commerce platform 100. For example, the data facility 134 and analytics 132 may be located outside the core commerce facility 136.

In various embodiments, the e-commerce platform 100 may provide for a platform payment facility 149, which is another example of a component that utilizes data from the core commerce facility 138 but may be located outside so as to not violate the isolation principle. The platform payment facility 149 may allow customers interacting with storefronts 139 to have their payment information stored safely by the core commerce facility 136 such that they only have to enter it once. When a customer visits a different storefront 139, even if they've never been there before, the platform payment facility 149 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from a storefront's checkout, allowing information to be made available globally across storefronts 139. It would be difficult and error prone for each storefront 139 to be able to connect to any other storefront 139 to directly retrieve the payment information stored there. As a result, the platform payment facility 149 may be implemented external to the core commerce facility 136.

For those functions that are not included within the core commerce facility 138, applications 142 provide a way to add features to the e-commerce platform 100. Applications 142 may be able to access and modify data on a merchant's storefront 139, perform tasks through the administrator 114, create new flows for a merchant through a user interface (e.g., that is surfaced through extensions/API 140), and the like. Merchants may be enabled to discover and install applications 142 through application searching 208 and application recommendations 210 (see FIG. 3). In various embodiments, core products, core extension points, applications, and the administrator 114 may be developed to work together. For instance, application extension points may be built inside the administrator 114 so that core features may be extended by way of applications 142, which may deliver functionality to a merchant through the extension/API 140.

In various embodiments, applications 142 may deliver functionality to a merchant through the extension/API 140, such as where an application 142 is able to surface transaction data to a merchant (e.g., App: "Surface my app in mobile and web admin using the embedded app SDK"), and/or where the core commerce facility 136 is able to ask the application to perform work on demand (core: "App, give me a local tax calculation for this checkout").

Applications 142 may support storefronts 139 and channels 110, provide merchant support, integrate with other services, and the like. Where the core commerce facility 136 may provide the foundation of services to the storefront 139, the applications 142 may provide a way for merchants to satisfy specific and sometimes unique needs. Different merchants will have different needs, and so may benefit from different applications 142. Applications 142 may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142 may be connected to the core commerce facility 136 through an extension/API layer 140, such as utilizing APIs to expose the functionality and data available through and within the core commerce facility 136 to the functionality of applications (e.g., through REST, GraphQL, and the like). For instance, the e-commerce platform 100 may provide API interfaces to merchant and partner-facing products and services, such as including application extensions, process flow services, developer-facing resources, and the like. With customers more frequently using mobile devices for shopping, applications 142 related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the core commerce facility 136, thus providing merchants what they need when they need it. For instance, shipping services 122 may be integrated with the core commerce facility 136 through a shipping or carrier service API, thus enabling the e-commerce platform 100 to provide shipping service functionality without directly impacting code running in the core commerce facility 136.

Many merchant problems may be solved by letting partners improve and extend merchant workflows through application development, such as problems associated with back-office operations (merchant-facing applications) and in the storefront (customer-facing applications). As a part of doing business, many merchants will use mobile and web related applications on a daily basis for back-office tasks (e.g., merchandising, inventory, discounts, fulfillment, and the like) and storefront tasks (e.g., applications related to their online shop, for flash-sales, new product offerings, and the like), where applications 142, through extension/API 140, help make products easy to view and purchase in a fast growing marketplace. In various embodiments, partners, application developers, internal applications facilities, and the like, may be provided with a software development kit (SDK), such as through creating a frame within the administrator 114 that sandboxes an application interface. In various embodiments, the administrator 114 may not have control over nor be aware of what happens within the frame. The SDK may be used in conjunction with a user interface kit to produce interfaces that mimic the look and feel of the e-commerce platform 100, such as acting as an extension of the core commerce facility 136.

Applications 142 that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the core commerce facility 136, such as for synchronizing a local database, notifying an external integration partner, and the like. Update events may enable this functionality without having to poll the core commerce facility 136 all the time to check for updates, such as through an update event subscription. In various embodiments, when a change related to an update event subscription occurs, the core commerce facility 136 may post a request, such as to a predefined callback URL. The body of this request may contain a new state of the object and a description of the action or event. Update event subscriptions may be created manually, in the administrator facility 114, or automatically (e.g., via the API). In various embodiments, update events may be queued and processed asynchronously from a state change that triggered them, which may produce an update event notification that is not distributed in real-time.

Figure 3:
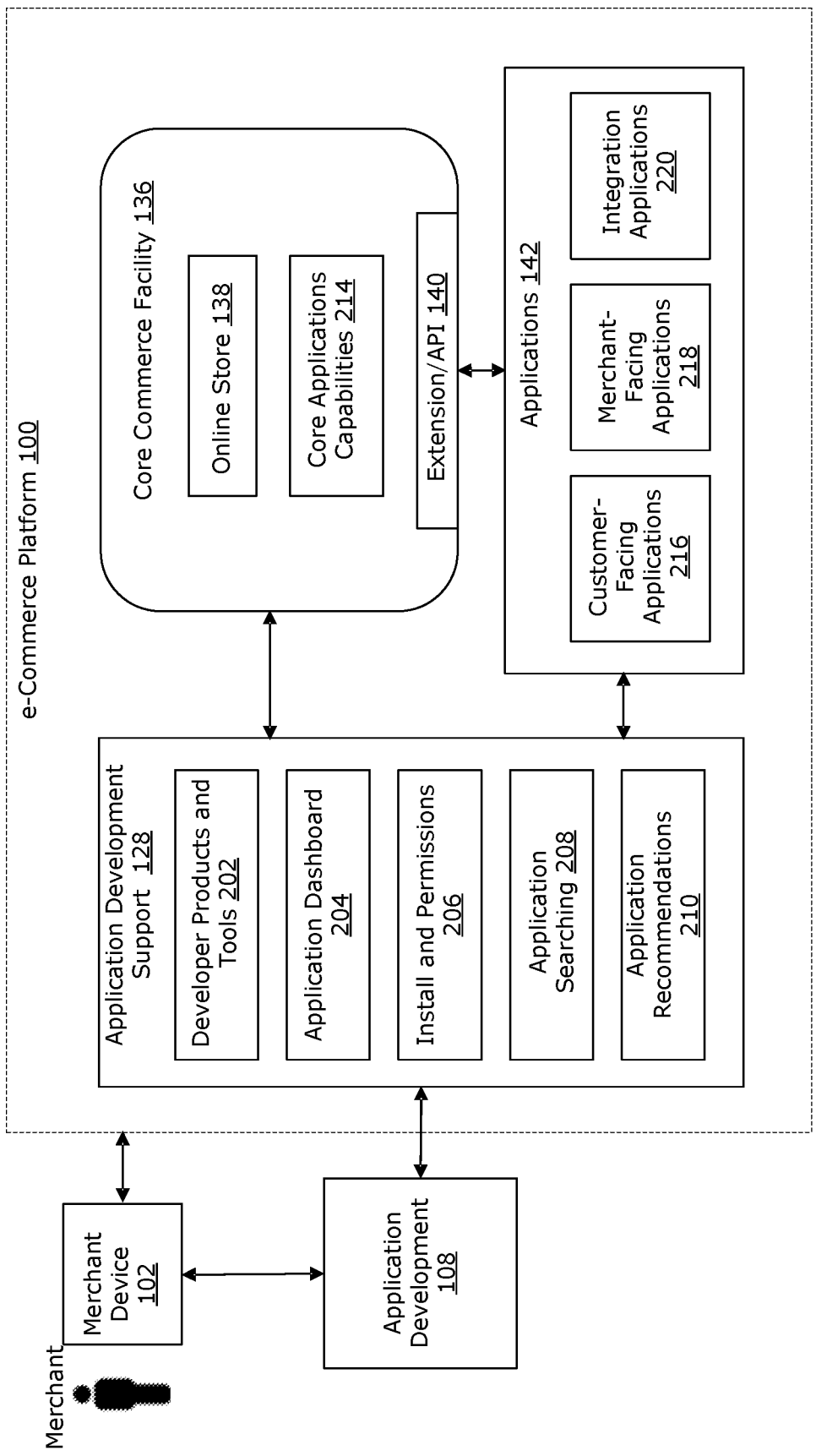
FIG. 3 is another block diagram of the e-commerce platform of FIG. 1, showing some details related to application development.

Reference is made to FIG. 3, which is another depiction of the e-commerce platform 100. FIG. 3 omits some details that have been described with reference to FIG. 1, and shows further details discussed below. In various embodiments, the e-commerce platform 100 may provide application development support 128. Application development support 128 may include developer products and tools 202 to aid in the development of applications, an application dashboard 204 (e.g., to provide developers with a development interface, to administrators for management of applications, to merchants for customization of applications, and the like), facilities for installing and providing permissions 206 with respect to providing access to an application 142 (e.g., for public access, such as where criteria must be met before being installed, or for private use by a merchant), application searching 208 to make it easy for a merchant to search for applications 142 that satisfy a need for their storefront 139, application recommendations 210 to provide merchants with suggestions on how they can improve the user experience through their storefront 139, a description of core application capabilities 214 within the core commerce facility 136, and the like. These support facilities may be utilized by application development 108 performed by any entity, including the merchant developing their own application 142, a third-party developer developing an application 142 (e.g., contracted by a merchant, developed on their own to offer to the public, contracted for use in association with the e-commerce platform 100, and the like), or an application being developed by internal personal resources associated with the e-commerce platform 100. In various embodiments, applications 142 may be assigned an application identifier (ID), such as for linking to an application (e.g., through an API), searching for an application, making application recommendations, and the like.

The core commerce facility 136 may include base functions of the e-commerce platform 100 and expose these functions through APIs to applications 142. The APIs may enable different types of applications built through application development 108. Applications 142 may be capable of satisfying a great variety of needs for merchants but may be grouped roughly into three categories: customer-facing applications 216, merchant-facing applications 218, or integration applications 220. Customer-facing applications 216 may include storefront 139 or channels 110 that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 218 may include applications that allow the merchant to administer their storefront 139 (e.g., through applications related to the web or website or to mobile devices), run their business (e.g., through applications related to POS devices 152), to grow their business (e.g., through applications related to shipping (e.g., drop shipping), use of automated agents, use of process flow development and improvements), and the like. Integration applications 220 may include applications that provide useful integrations that participate in the running of a business, such as shipping providers 112 and payment gateways.

In various embodiments, an application developer may use an application proxy to fetch data from an outside location and display it on the page of an online storefront 139. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142 so that the core commerce facility 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110, adds what they intend to buy to their cart, proceeds to checkout, and pays for the content of their cart resulting in the creation of an order for the merchant. The merchant may then view and fulfill (or cancel) the order. The product is then delivered to the customer. If the customer is not satisfied, they might return the products to the merchant.

In an example embodiment, a customer may browse a merchant's products on a channel 110. A channel 110 is a place where customers can view and buy products. In various embodiments, channels 110 may be modeled as applications 142 (a possible exception being the online store 138, which is integrated within the core commence facility 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In various embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., "secret" strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110 may use the core commerce facility 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through the card server environment 148. In various embodiments, the payment gateway 106 may accept international payment, such as integrating with leading international credit card processors. The card server environment 148 may include a card server application, card sink, hosted fields, and the like. This environment may act as the secure gatekeeper of the sensitive credit card information.

Figure 4:
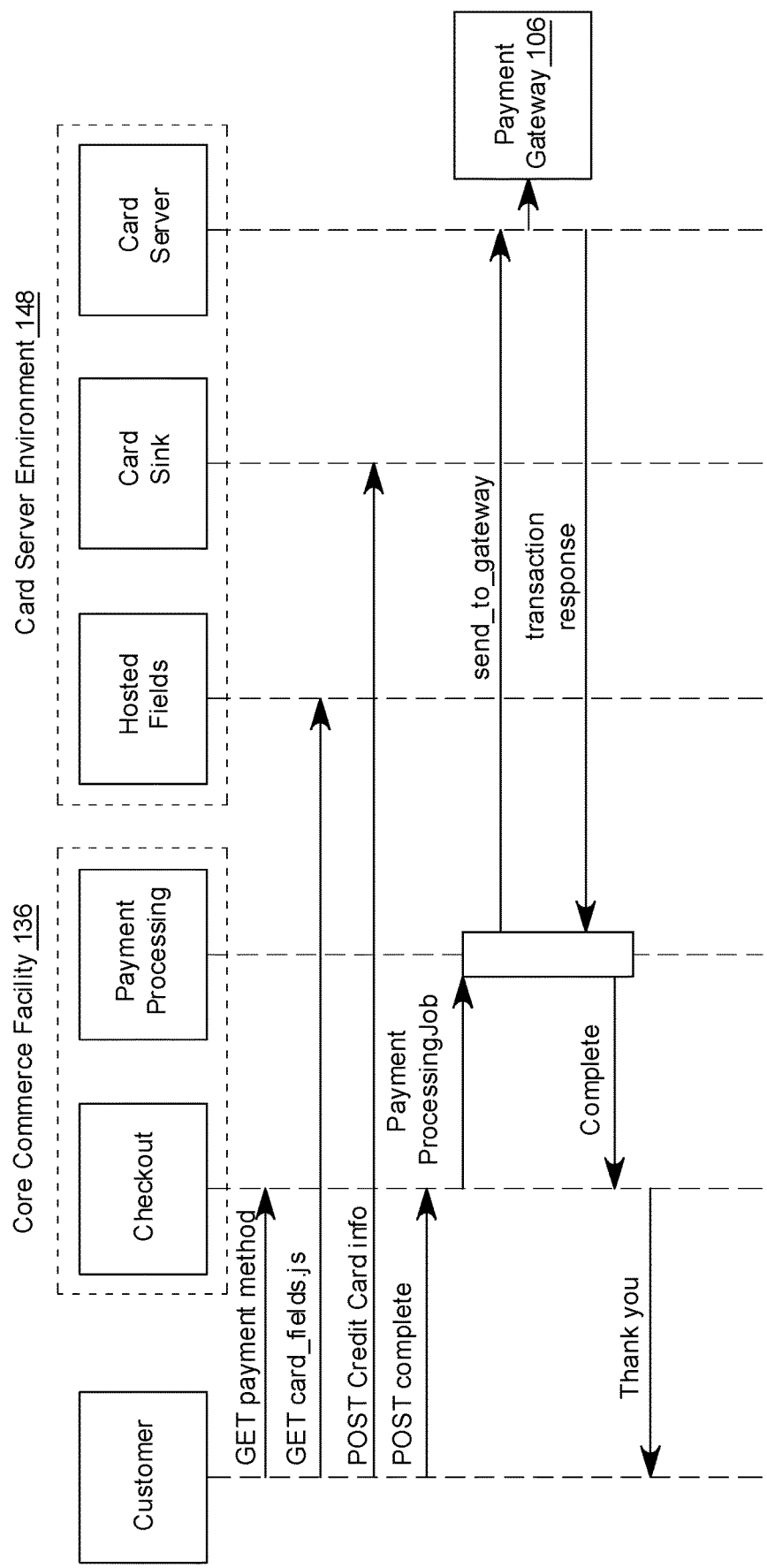
FIG. 4 shows an example data flow that may take place when a purchase is made using the e-commerce platform of FIG. 1.

FIG. 4 presents, in a non-limiting example, a simplified sequence diagram of the interactions between the core commerce facility 136 and the card server environment 148 during payment processing of a credit, prepaid, gift or other card on a Web Checkout.

In various embodiments, most of the process may be orchestrated by a payment processing job. The core commerce facility 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110 that do not rely on core commerce facility checkouts may use an order API to create orders. Once an order is created, an order confirmation notification may be sent to the customer and an order placed notification sent to the merchant via a notifications component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as tailored towards impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represent an item whose quantity and location is managed). An inventory level component may keep track of quantities that are available for sale, committed to an order or incoming from an inventory transfer component (e.g., from a vendor). The merchant may then view and fulfill (or cancel) the order.

An order assessment component may implement a business process merchants use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In various embodiments, this business process may be implemented by a fulfillment component. The fulfillment component may group the line items of the order into a logical fulfillment unit of work based on an inventory location and fulfillment service. The merchant may assess the order, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that does not provide an API connection). An API fulfillment service may trigger a third party, where the third-party application creates a fulfillment record. A legacy fulfillment service may trigger a custom API call from the core commerce facility 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a returns component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that were not returned and remain in the customer's hands); and the like. A return may represent a change to the contract of sale (e.g., the order), and where the e-commerce platform 100 may make the merchant aware of compliance issues with respect to legal obligations (e.g., with respect to taxes). In various embodiments, the e-commerce platform 100 may enable merchants to keep track of changes to the contract of sales over time, such as implemented through a sales model component (e.g., an append-only date-based ledger that records sale-related events that happened to an item).

Figure 5:
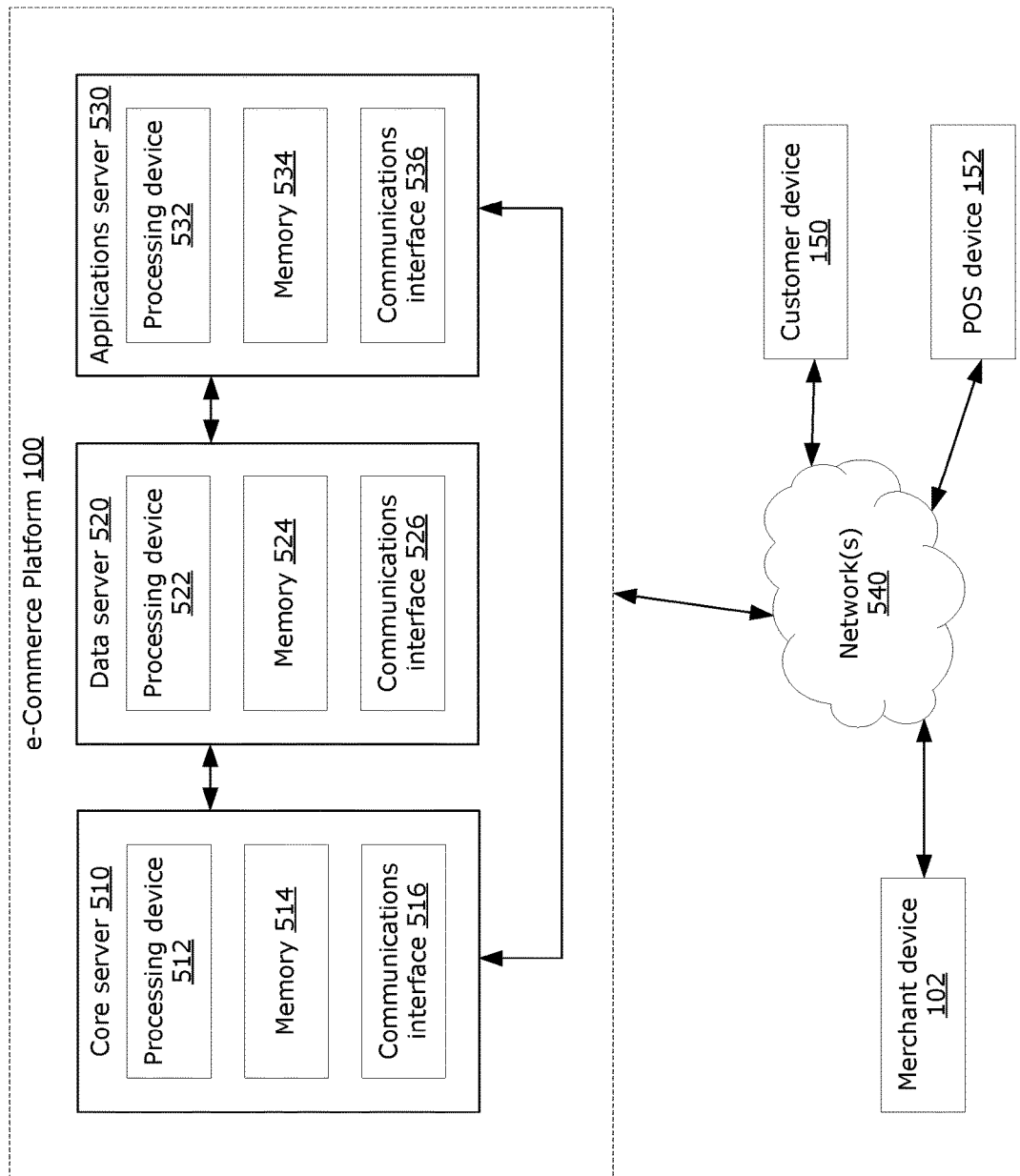
FIG. 5 is a block diagram illustrating an example implementation of the e-commerce platform of FIG. 1.

FIG. 5 is a block diagram of an example hardware configuration of the e-commerce platform 100. It should be noted that different components of the e-commerce platform 100 (e.g., the data facility 134, analytics facility 132, core commerce facility 136 and applications 142) may be implemented in separate hardware or software components, on a common hardware component or server or configured as a common (integrated) service or engine in the e-commerce platform 100. In the example of FIG. 5, the e-commerce platform 100 includes a core server 510, a data server 520 and an applications server 530, which are each in communication with each other (e.g., via wired connections and/or via wireless intranet connections). Each of the servers 510, 520, 530 include a respective processing device 512, 522, 532 (each of which may be, for example, a microprocessor, graphical processing unit, digital signal processor or other computational element), a respective memory 514, 524, 534 (each of which may be, for example, random access memory (RAM), read only memory (ROM), hard disk, optical disc, subscriber identity module (SIM) card, memory stick, secure digital (SD) memory card, and the like, and may include tangible or transient memory), and a respective communications interface 516, 526, 536 (each of which may include transmitter, receiver and/or transceiver for wired and/or wireless communications). The core server 510 may store instructions and perform operations relevant to core capabilities of the e-commerce platform, such as providing the administrator 114, analytics 132, core commerce facility 136, services 116 and/or financial facility 130, among others. The data server 520 may be used to implement the data facility 134, among others. The applications server 530 may store instructions and perform operations relevant to the applications 142, such as storing instructions and data for the applications 142 and for implementing application development support 128.

Merchants and customers, using respective devices 102, 150, 152 may access the e-commerce platform 100 via one or more networks 540 (e.g., wired and/or wireless networks, including a virtual private network (VPN), the Internet, and the like).

Although FIG. 5 illustrates an example hardware implementation of the e-commerce platform 100, it should be understood that other implementations may be possible. For example, there may be greater or fewer numbers of servers, the e-commerce platform 100 may be implemented in a distributed manner, or at least some of the memories 514, 524, 534 may be replaced with external storage or cloud-based storage, among other possible modifications.

Figure 6:
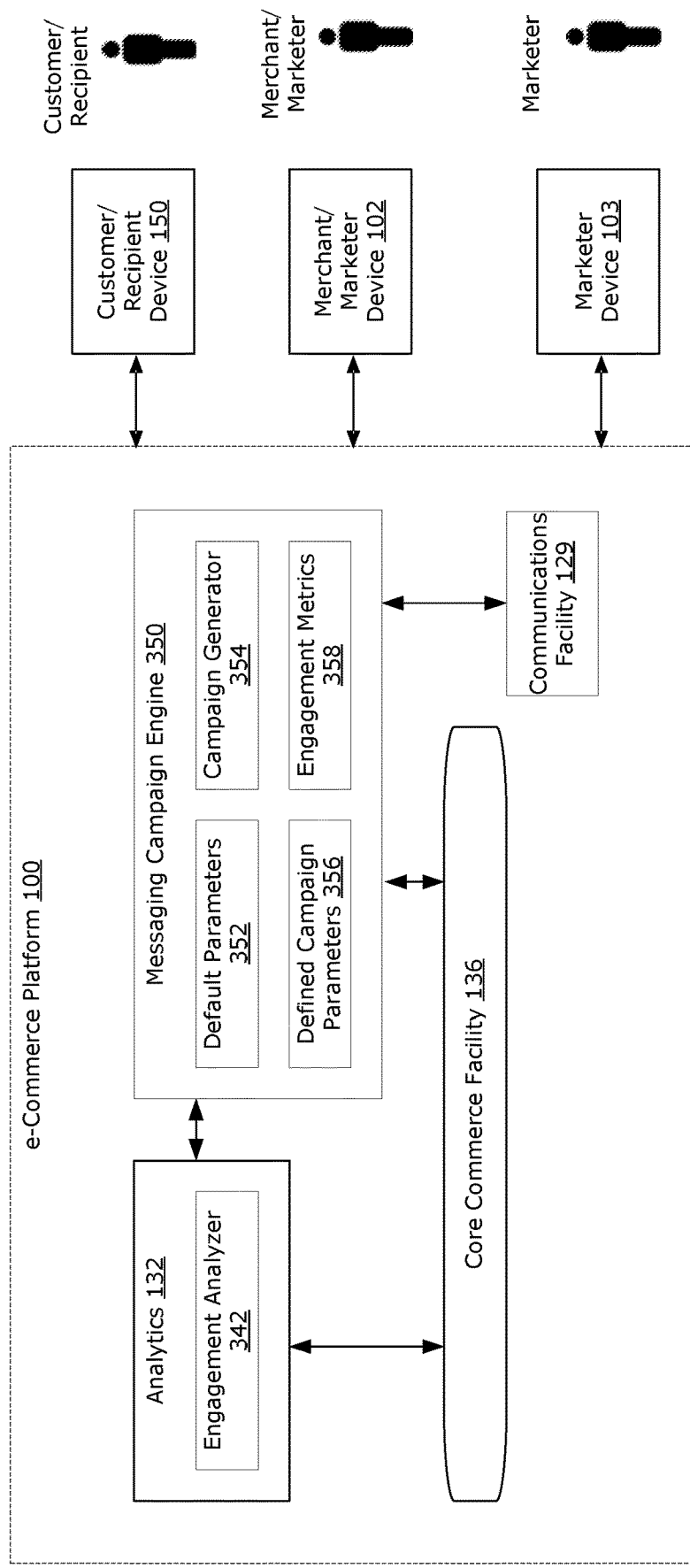
FIG. 6 is another block diagram of the e-commerce platform of FIG. 1, showing some details related to a messaging campaign engine.

FIG. 6 is another depiction of the e-commerce platform 100 that omits some details that have been described with reference to FIG. 1, and shows further details discussed below. In particular, FIG. 6 illustrates some details of the e-commerce platform 100 that are relevant to generating and managing a messaging campaign.

In the context of a messaging campaign, a customer of the e-commerce platform 100 may also be a recipient who is an intended recipient of a directed messaging campaign. Accordingly, FIG. 6 illustrates the customer as a customer/recipient, and the customer/recipient may interact with the e-commerce platform 100 via the customer/recipient device 150. However, it should be understood that not all customers of the e-commerce platform 100 may be a recipient of a messaging campaign, and not all recipients of a messaging campaign may be a customer of the e-commerce platform 100. For generality, the present disclosure will refer to "recipients" of a directed messaging campaign. In cases where a recipient is not a current customer of the e-commerce platform 100, the e-commerce platform 100 may nonetheless obtain at least generalized information about the online behavior of the non-customer recipient, for example via anonymized statistical data and/or via user-consented sharing of information with a social media platform, among other possibilities.

In the context of a messaging campaign, a merchant on the e-commerce platform 100 may also be a marketer who is planning a messaging campaign. Accordingly, FIG. 6 illustrates the merchant as a merchant/marketer, and the merchant/marketer may interact with the e-commerce platform via the merchant/marketer device 102. Additionally, a marketer (who is not also a merchant on the e-commerce platform 100) may interact with the e-commerce platform 100 via a marketer device 103. Such a marketer may, for example, use certain services provided by the e-commerce platform 100, such as for generating a messaging campaign as discussed below, without having to be a customer or merchant who is subscribed to the e-commerce platform 100. In some examples, the e-commerce platform 100 may make certain services/applications, such as the messaging campaign engine discussed below, accessible to users as standalone services/applications.

The analytics facility 132 in this example includes an engagement analyzer 342, which may be implemented as a sub-module of the analytics facility 132 or may be implemented as part of the general functions of the analytics facility 132. As will be discussed further below, the engagement analyzer 342 serves to analyze online behavior of customers, in order to determine (a level of) engagement of customers with certain distribution channels, certain online stores and/or certain messages, among other possibilities. In some examples, some or all functions of the engagement analyzer 342 may be implemented using a machine-learning system.

The e-commerce platform 100 in this example includes a messaging campaign engine 350. The messaging campaign engine 350 may be part of the applications 142 or services 116 of the e-commerce platform 100 for example, or may be a standalone component of the e-commerce platform 100. The messaging campaign engine 350 may, for example, be implemented by the applications server 530 of FIG. 5. The messaging campaign engine 350 in this example includes a campaign generator 354 sub-module. The campaign generator 354 enables automatic generation of recommended parameters for a messaging campaign, as will be discussed further below. The messaging campaign engine 350 may communicate with the communication facility 129 or another communications interface of the e-commerce platform 100 to enable distribution of messages in accordance with a defined campaign. The messaging campaign engine 350 in this example also stores messaging campaign-related data, such as default campaign parameters 352, defined campaign parameters 356 and engagement metrics 358. The engagement metrics 358 may be provided to the messaging campaign engine 350 by the analytics facility 132. In some examples, some or all of the messaging campaign-related data, such as default campaign parameters 352, defined campaign parameters 356 and engagement metrics 358, may be stored outside of the messaging campaign engine 350, for example in the data facility 134 (see FIG. 1).

A merchant or marketer may engage with the messaging campaign engine 350 to plan and implement a messaging campaign. For simplicity, the following discussion will refer to a merchant engaging with the messaging campaign engine 350; however it should be understood that the following discussion may be similarly applicable in the case of a non-merchant marketer instead of a merchant/marketer.

A merchant may submit a proposed messaging campaign via the merchant device 102, using a user interface (e.g., an online portal) provided by the e-commerce platform 100. A proposed messaging campaign may be submitted by, for example, selecting from available campaign templates that may be populated using the default campaign parameters 352. A proposed messaging campaign may be submitted by only selecting a subset of the required campaign parameters (e.g., submitting only the message content), and the messaging campaign engine 350 may use default campaign parameters 352 to populate the remaining required campaign parameters.

In some examples, the merchant may not be required to submit any campaign parameters at all. Instead, the e-commerce platform 100 may use information already available (via the e-commerce platform 100's analytics facility 132 for example) about the merchant's online store 138 to automatically generate a proposed messaging campaign. For example, the messaging campaign engine 350 may automatically generate a proposed set of campaign parameters for a messaging campaign, based on information about the type of offering, number of sales, inventory size, etc. of the merchant's online store 138 on the e-commerce platform 100.

A messaging campaign, in the present disclosure, may be a planned set of messages (which may be marketing messages, in which case the messaging campaign may also be referred to as a marketing campaign) that is communicated to certain intended recipients. In the present disclosure, a messaging campaign (and in particular a marketing campaign) may be associated with an online store (e.g., the online store 138 of the e-commerce platform 100, or an online store that is not part of the e-commerce platform 100) and/or an online merchant.

A messaging campaign may be defined by a set of campaign parameters, such as: number of phases of the campaign, number of different messages, a schedule for sending out messages (which may be defined in absolute terms (e.g., specific date(s) and/or time(s)), relative terms (e.g., interval of days between phases of the campaign), conditional terms (e.g., conditional on an intended recipient clicking on a link), etc.), content(s) of messages (which may or may not include an incentive, such as a coupon or discount), intended recipients (which may be defined as individuals, groups, demographics, etc.), distribution channel(s) (e.g., email, text message, social network message, etc.), among other possible parameters.

A messaging campaign may be conducted over multiple phases. For example, a campaign may be divided into multiple phases based on the schedule. Multiple messages may be directed towards a given recipient over the multiple phases of the campaign. For example, a first phase may communicate an initial first message to the given recipient, then according to the schedule a second message (which may have the same content or different content from the first message) may be communicated again to the same given recipient in a second phase of the campaign.

The messaging campaign engine 350 may store default parameters 352, which may be predefined (e.g., by the e-commerce platform 100). The default parameters 352 are messaging campaign parameters that may be used to generate and carry out a messaging campaign when one or more required parameters have not been submitted by a merchant. In some examples, the default parameters 352 may be general to all merchants using the services of the messaging campaign engine 350. In some examples, there may be some level of specificity in the default parameters 352, for example there may be different sets of default parameters 352 depending on the size (e.g., as measured by the amount of yearly sales) of the merchant.

A merchant using the services of the messaging campaign engine 350 may also submit (e.g., via a user interface, such as an online portal provided by the e-commerce platform 100, which may be accessible via a merchant device 102 or marketer device 103) one or more user-submitted parameters for a messaging campaign. The user-submitted parameter(s) may be supplemented by one or more default parameters 352 as appropriate. In some examples, instead of submitting any user-submitted parameters, a merchant may select to use the default parameters 352.

The messaging campaign engine 350 uses the campaign generator 354 to generate a set of parameters for a messaging campaign. For example, the campaign generator 354 may determine that a set of user-submitted parameters should be supplemented by one or more default parameters 352 (e.g., the merchant has not submitted intended recipients, so the campaign generator 354 identifies a default intended demographic from the default parameters 352 and adds this as a parameter for the messaging campaign). As will be discussed further below, the campaign generator 354 may generate recommended parameters for a messaging campaign, such as recommended distribution channel(s) for certain groups (or subgroups) of intended recipients. The campaign generator 354 may generate recommended parameters prior to the start of a messaging campaign, as well as dynamically during the life of the messaging campaign (e.g., generating new recommended parameters for different phases of a campaign). Any recommended parameter(s) generated by the campaign generator 354 may be notified to a merchant, who may be offered an option to accept or reject the recommended parameter(s).

After a set of campaign parameters have been approved by the merchant (e.g., via the user interface provided by the e-commerce platform 100), including any recommended parameter(s) that have been offered for merchant approval, the approved parameters may be stored in the defined campaign parameters 356 of the messaging campaign engine 350. The messaging campaign engine 350 may store multiple sets of defined campaign parameters 356, corresponding to respective multiple messaging campaigns. The defined campaign parameters 356 stored by the messaging campaign engine 350 may be limited to active or ongoing messaging campaigns, or may also include historical or completed messaging campaigns.

The messaging campaign engine 350 uses the set of defined campaign parameters 356 to generate messages with the defined message content(s), addressed to the defined intended recipient(s), to be sent over the defined distribution channel(s), and according to the defined schedule. In some examples, the messaging campaign engine 350 may make use of message templates (which may be stored as default parameters 352) to create message content(s). In some examples, the messaging campaign engine 350 may extract or otherwise obtain information (e.g., contact information for individual intended recipients) from the data facility 134 or other database in order to generate the messages. For example, the messaging campaign engine 350 may use customer information stored in the data facility 134 to identify individuals that belong in the group of intended recipients (e.g., a defined demographic, such as a defined age group) defined for a messaging campaign, and generate messages to those individuals using contact information stored in the data facility 134. For privacy and security purposes, the messaging campaign engine 350 may limit the customer information extracted for a particular merchant campaign to information collected with consent (e.g., by the particular merchant and/or the platform 100) and not make such extracted information available to other merchants or third parties. The messaging campaign engine 350 may then provide the generated messages to the communications facility 129, which in turn transmits the messages to the intended recipient(s) over the defined distribution channel(s).

The engagement analyzer 342 analyzes recipients' engagement with a messaging campaign. The engagement analyzer 342 may analyze engagement over the entire schedule of a messaging campaign, and may also analyze engagement for a defined period of time (e.g., one month) after the end of a messaging campaign. The engagement analyzer 342 may analyze recipients' engagement in an individualized manner and/or in a generalized (e.g., aggregated or statistical) manner. For example, if an individual recipient gives permission to access individualized information, the engagement analyzer 342 may analyze how that individual recipient responds (e.g., open or delete a message, click on a link in a message, etc.) to each phase of a given messaging campaign. In another example, the engagement analyzer 342 may analyze engagement in a generalized manner, for example by calculating statistics on the percentage of messages that were read in each phase of a given messaging campaign. Various suitable techniques may be used for individualized or generalized analysis of engagement.

The engagement analyzer 342 may generate engagement metrics for a given messaging campaign. The engagement metrics may be individualized and/or generalized, depending on the type of analysis carried out. The engagement metrics may be a quantitative representation of the degree to which intended recipient(s) engage with the given messaging campaign. Output generated by the engagement analyzer 342 may be stored by the messaging campaign engine 350 as engagement metrics 358. The engagement metrics 358 may be stored in association with information identifying the corresponding messaging campaign. In some examples, the engagement metrics 358 may be stored in association with information about certain parameters of the messaging campaign. Such detailed information may enable the messaging campaign engine 350 to determine (e.g., using a predictive algorithm or using a machine-learning system) which campaign parameters are more likely to result in positive engagement from intended recipients. For example, a response likelihood matrix or other statistics-based analytics may be generated to learn typical recipient responses, based on multiple historical campaigns.

In some examples, the engagement metrics 358 may be stored in association with information identifying an individual recipient or a generalized recipient group (e.g., demographic group). Engagement metrics 358 may be updated over the life of a messaging campaign (e.g., as recipients are messaged over multiple phases of the campaign). In some examples, engagement metrics 358 may be updated over multiple messaging campaigns (e.g., if a merchant conducts multiple messaging campaigns over time).

In an example, engagement metrics 358 may be a score between 0 to 5, with 0 indicating most negative engagement (e.g., recipient deleted message or unsubscribed from future messages), 2 indicating non-engagement (e.g., recipient did not open message or recipient is a new intended recipient), and 5 indicating most positive engagement (e.g., recipient made a purchase after receiving message).

In some examples, as discussed further below, a recipient's engagement with the messaging campaign may be evaluated based on analysis of the recipient's online activity. The online activity may be online activity that is associated with a store (which may or may not be the online store for which the messaging campaign is being generated). Online activity may include, for example, a page view event, an offering selection event, a purchase transaction event, a product search event, an offering return event, a page share event (e.g., sharing over a social network or other online channel), a virtual shopping cart event (e.g., an addition of an offering to the virtual shopping cart, or removal of an offering from the virtual shopping cart), a purchase abandonment event (e.g., starting a purchase transaction (e.g., beginning checkout of virtual shopping cart) without completing the purchase transaction), and/or a product review event, among other possibilities.

A recipient's online activity may be considered to be relevant to a messaging campaign without there being a direct correlation with the messaging campaign. For example, online activity that takes place during (or shortly after) a given messaging campaign may be the purchase of an offering that is related to (e.g., in the same category) the offering promoted in the given messaging campaign, which may affect how the recipient would respond or engage with the given messaging campaign. This may be taken into account in the engagement metrics 358. For example, online activity related to a given store (e.g., a page view of a store's website) that occurs subsequent to a messaging campaign for that given store may be considered a positive engagement for the messaging campaign (a causal relationship need not be established). The online activity may also be related to one or more campaign parameters. For example, a page view of a store's website may be a positive engagement with a message sent via a certain distribution channel (e.g., email).

Figure 7:
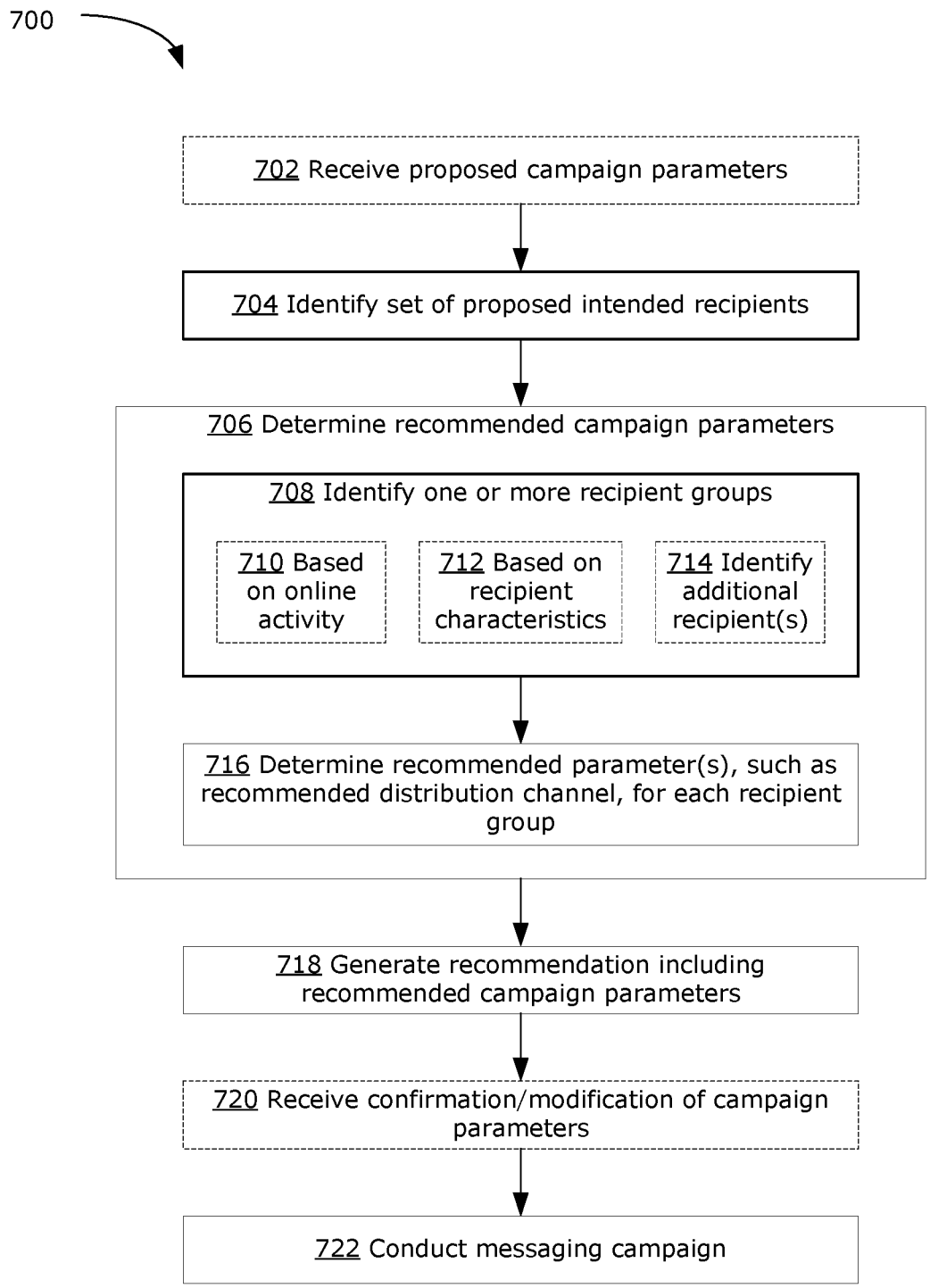
FIG. 7 is a flowchart illustrating an example method for generating a messaging campaign.

FIG. 7 is a flowchart illustrating an example method 700 for generating a messaging campaign associated with an online store. The method 700 may be implemented by the e-commerce platform 100 (e.g., using the messaging campaign engine 350 and/or the analytics facility 132). The method 700 may be implemented by a processing device executing instructions (e.g., at the core server 510 or the applications server 530).

Optionally, at 702, a set of proposed campaign parameters is received. The set of proposed campaign parameters may be user-submitted parameters, for example received from a merchant or marketer via an online user interface provided by the e-commerce platform 100.

At 704, a set of proposed intended recipients for the proposed messaging campaign is identified. The intended recipients may be identified from the proposed campaign parameters received at 702. Alternatively, the intended recipients may be identified based on default parameters. For example, the campaign generator 354 may receive identification of a set of intended recipients from the default parameters 352, if no user-submitted intended recipients was provided. The set of intended recipients may be identified by recipient identifier (e.g., customer profile ID), recipient contact information (e.g., email address, phone number), demographic group (e.g., certain characteristics such as age, gender, geographical location, etc.), among other possibilities.

At 706, one or more recommended campaign parameters are determined. Determining recommended campaign parameter(s) includes steps 708 and 716 described below.

At 708, one or more intended recipient groups are identified from the set of intended recipients. Intended recipient groups (also referred to simply as groups or recipient groups) are generally non-overlapping groups, each having one or more intended recipients. Recipient groups are identified from the set of intended recipients based on various optional criteria, such as: based on recipients' online activity (at 710); based on recipients' characteristics (at 712); and/or by identifying additional recipient(s) to be included (At 714). Such criteria may be used in combination for identifying groups of intended recipients.

Generally, the groups identified at 708 are non-overlapping groups, meaning that there is no intended recipient common between two identified groups. This may help to avoid overlapping sub-campaigns, so that an intended recipient is not overwhelmed with the same message from multiple distribution channels. In other examples, it may be useful to allow overlapping groups at 708, meaning that there may be intended recipient(s) common between two or more identified groups. Overlapping groups may be useful in situations where it would be desirable to message the same intended recipient over multiple distribution channels, possibly with different messages being sent over different distribution channels, to increase exposure.

For example, optionally at 710, a group may be identified based on online activity associated with member(s) of that group. The online activity may be online activity that is associated with a store (which may or may not be the online store for which the messaging campaign is being generated). Online activity may include, for example, a page view event, an offering selection event, a purchase transaction event, a product search event, an offering return event, a page share event (e.g., sharing over a social network or other online channel), a virtual shopping cart event (e.g., an addition of an offering to the virtual shopping cart, or removal of an offering from the virtual shopping cart), a purchase abandonment event (e.g., starting a purchase transaction (e.g., beginning checkout of virtual shopping cart) without completing the purchase transaction), and/or a product review event. The online activity may also be online activity and/or events associated with previous messaging campaigns.

Online activity of potential intended recipients may be determined by the analytics facility 132, prior to or at the time of performing the method 700. For example, the analytics facility 132 may have access to information about how customers of the e-commerce platform 100 interact with online stores 138 hosted by the e-commerce platform 100, including events indicative of which customer has viewed, selected, purchased, searched, returned, or reviewed a given offering of a given online store 138, for example. In some examples, online activity of potential intended recipients may be alternatively or additionally determined by a system external to the e-commerce platform 100 and provided to the e-commerce platform 100. For example, the e-commerce platform 100 may have an agreement with an external system (e.g., a social media platform, an external retail platform, an online search platform, etc.) to obtain event information or other analytics (which may be anonymized or generalized for privacy reasons) indicative of online behavior of certain individuals or demographics.

The campaign generator 354 may cross-reference such analytics with the proposed intended recipients to identify groups among the intended recipients. For example, analytics (whether from the analytics facility 132 of the e-commerce platform 100 or from an external system) may indicate that certain individuals have recently (e.g., within the past month) purchased something from the online store for which the messaging campaign is being generated. Those individuals may be identified as one group, and individuals who have not purchased from the online store recently may be identified as another group.

In some cases, an intended recipient may use different identifiers for different online activity. For example, an intended recipient may have one identifier for social media activity, and a different identifier related to online purchases.

The analytics facility 132 may determine that the two different identifiers are in fact related to the same intended recipient, for example by cross-referencing the different identifiers with some common information (e.g., a common shipping address) that is known (e.g., from customer profile information stored on the e-commerce platform 100).

The analysis of online activity may be anonymized and/or categorized by group characteristics (e.g., age, geographical region, family status, etc.). In some examples, the analysis of online activity may be generalized across multiple stores. When generalized across multiple stores, the online activity can be further categorized or segmented by store type, store size, relevant industry, offering category, etc.

Information extracted from such analysis may be maintained internal to the e-commerce platform 100 and may not be shared with merchants, customers, or external users (e.g., in order to ensure privacy and security). In some examples, information from such analysis may be extracted using a machine-learning system. If a machine-learning system is used, the extraction of analytics may be performed in a hidden layer of the machine-learning system (i.e., not part of the output provided by the machine-learning system), such that such analytics is not explicitly exposed even within the e-commerce platform 100.

In another example, optionally at 712, a group may be identified based on characteristics of member(s) of that group. Characteristics may include non-behavioral characteristics, such as demographic characteristics. For example, characteristics that may be used to identify a group include age, income, gender, geographical location, family status, among other possibilities.

Characteristics of potential intended recipients may be determined based on information stored in the data facility 134 (e.g., customer profile information). For example, individual intended recipients may be cross-referenced with their customer profiles based on their contact information. In some examples, the parameters defining intended recipients may define the intended recipients in terms of their characteristics (e.g., based on a certain demographic), in which case information from the data facility 134 may be used to identify individuals that fit the desired demographic. From those identified individuals, further characteristics may be determined, which may be used to divide the desired demographic into separate recipient groups. Alternatively or additionally, groups may be divided out from a defined desired demographic, based on known statistics about that demographic. For example, a campaign parameter may specify that the campaign is to be directed towards the age group 19-29. The campaign generator 354 may further identify, from that demographic, a group of intended recipients having incomes below $50,000 and another group having incomes above $50,000.

In another example, optionally at 716, one or more additional recipients may be identified, who were not included in the set of intended recipients identified at 704.

For example, the campaign generator 354 may identify potential intended recipient(s) excluded from the initial set of intended recipients (e.g., initial set of intended recipients is only males aged 19-29, and the campaign generator 354 may identify females aged 19-29 as additional intended recipients). This may be based on analytics (e.g., from the analytics facility 132) indicating that purchasing habits of the initially excluded recipient(s) is similar to the purchasing habits of the initially identified intended recipients.

In another example, the campaign generator 354 may identify a group of intended recipients that is partly within the initially identified intended recipients (e.g., initial set of intended recipients is only university students, and the campaign generator 354 may identify all those aged 19-29 as additional intended recipients).

After identifying one or more groups, at 716, a recommended distribution channel is determined for each group. A distribution channel for a message in the messaging campaign may be a message over a social network service, a message over an email service, a message over a messaging service in a merchant app, or a message over a text or other (e.g., direct) messaging service, among other possibilities. Different distribution channels may be recommended for different (non-overlapping) recipient groups. For example, a first distribution channel (e.g., email) may be recommended for a first group, and a different second distribution channel (e.g., social media) may be recommended for a second non-overlapping group.

For example, the campaign generator 354 may determine that a group that has purchased an offering from the online store is more likely to have positive engagement with a message sent via email hence email distribution to that group is recommended; or that an age group 30-49 is more likely to have positive engagement with a message sent via direct text messaging. This may be determined based on a predefined rule, or based on behavior patterns determined via machine-learning, and/or based on historical engagement. The recommended distribution channel may be determined based on information derived from one or more other messaging campaigns conducted for the same or different online store. For example, information from the engagement metrics 358 may be used to determine (e.g., by training a machine-learning system on the historical campaigns and associated engagement metrics 358) how different recipient groups positively or negatively engage with various messaging campaigns having different campaign parameters.

For example, the campaign generator 354 may determine that positive online activity (e.g., events indicative of an online purchase) in a given group is correlated with a prior message delivered via a particular distribution channel (e.g., email), and hence recommend the same distribution channel again for that given group.

In addition or alternative to determining a recommended distribution channel for each group, the campaign generator 354 may generate other recommended parameters, such as: a recommended campaign schedule for at least one group; a recommended message content for at least one group; a recommended number of messages or campaign phases for at least one group; or a recommended incentive to be included in a message for at least one group, among other possibilities. It should be understood that parameters may be recommended in combination. For example, a first set of recommended parameters for a first group may include both a first distribution channel (e.g., email) and a first schedule (e.g., messages sent on a monthly basis), and a second set of recommended parameters for a second group may include both a second distribution channel (e.g., social media) and a second schedule (e.g., messages sent on a weekly basis).

At 718, a recommendation is generated including the recommended campaign parameters. The recommendation includes indication of the identified group(s) and the respective recommended parameter(s) (e.g., recommended distribution channel) for each group. If additional recipient(s) have been identified at 714, the recommendation may include an indication (e.g., a general indication of the demographic or characteristics) of the additional recipient (s).

For privacy reasons, the recommendation that is provided to the merchant or marketer may omit identifying information about individual recipients. For example, if the recommended campaign parameter has identified individuals A, B and C belonging to group X and that distribution channel Y should be used to direct messages towards group X, the merchant or marketer may only be notified that it is recommended to direct messages to "some" recipients via distribution channel Y.

In some examples, the recommendation may be provided to the merchant or marketer in the form of a notification (e.g., via the user interface), and may offer an option to accept or reject the recommendation. If the option to accept or reject is provided, the recommendation may also include a predicted success rate or historical success rate associated with certain recommended parameter(s) to motivate the merchant or marketer to accept the recommended parameter(s). In other examples, the recommendation may be automatically implemented without providing an option to reject the recommendation. In some examples, the recommendation may not be explicitly provided to the merchant or marketer, and may be automatically implemented without explicit notification to the merchant or marketer.

Optionally, at 720, if an option to accept or reject the recommendation was provided, a confirmation or modification of campaign parameters may be received (e.g., via a user interface).

At 722, the messaging campaign is conducted (e.g. campaign messages are sent to the intended recipients) using the campaign parameters. In some examples, the messaging campaign is conducted by the messaging campaign engine 350. In other examples, the messaging campaign engine 350 may output the campaign parameters to enable the messaging campaign to be conducted by an external system. For example, a marketer may use the messaging campaign engine 350, as a service provided by the e-commerce platform 100 (or as a stand-alone service provided externally to the e-commerce platform), to better tailor the campaign parameters designed by the marketer's own external campaign system.

Figure 8:
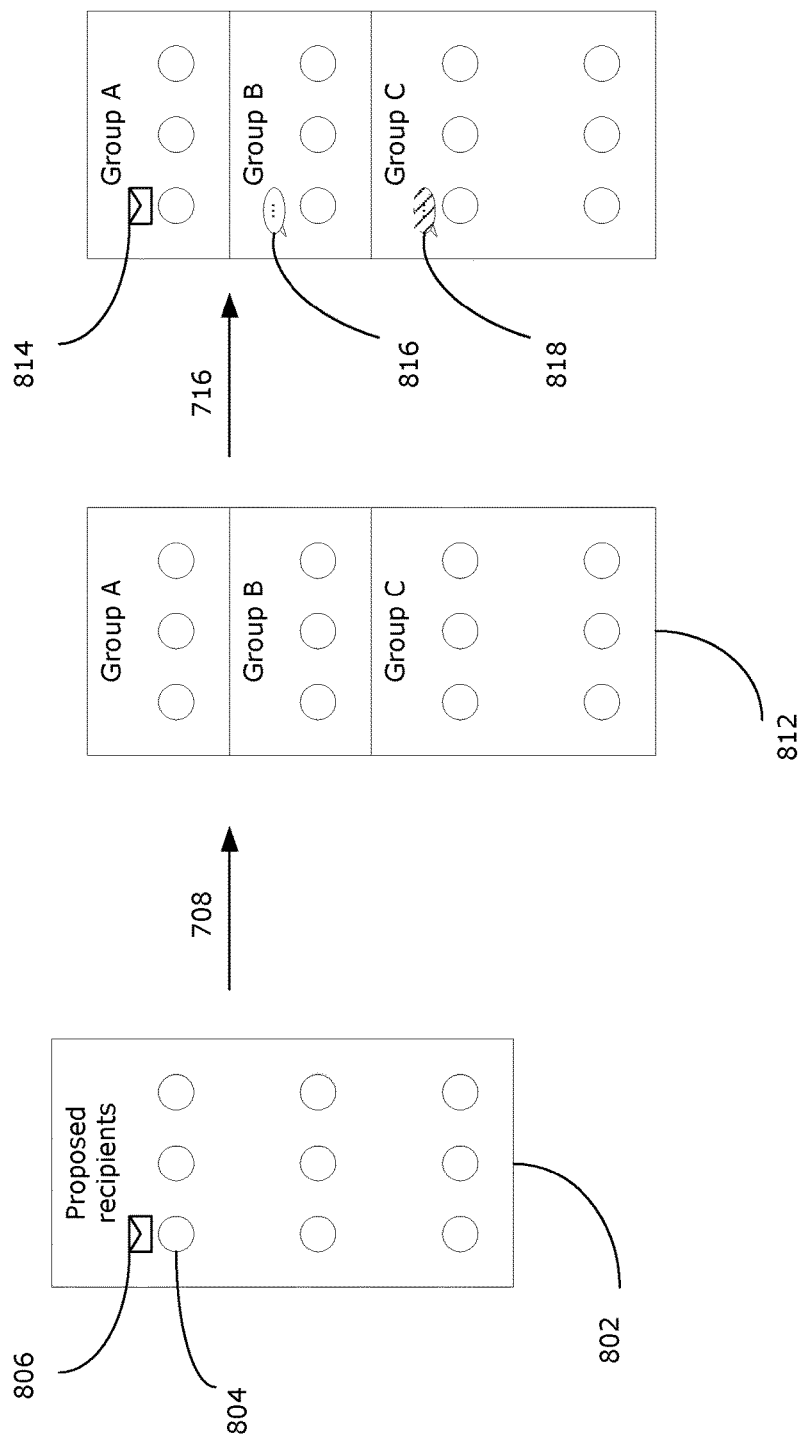
FIG. 8 is a schematic illustration of a simplified example of aspects of the method of FIG. 7.

FIG. 8 schematically illustrates a simplified example of aspects of the method 700, which may be carried out by the messaging campaign engine 350. In this example, a set of proposed campaign parameters (which may be received at optional step 702) includes a set of proposed intended recipients 802 (identified at step 704). The set of proposed intended recipients 802 includes individual intended recipients 804, which may or may not be explicitly defined in the proposed campaign parameters. The set of proposed campaign parameters also includes a proposed distribution channel and message content, in this example message content sent via an email service 806.

Recommended campaign parameters are determined, including step 708 to identify one or more groups 812 from the set of proposed intended recipients 802. In this example, groups 812 A, B and C have been identified. For example, the groups 812 may have been determined based on online activity of recipients 804 (e.g., using optional step 710) and/or based on characteristics of recipients 804 (e.g., using optional step 712). Further, in this example group 812 C includes additional recipients 804 not included in the original set of proposed intended recipients (e.g., using optional step 714).

Using step 716, recommended parameter(s) are determined for each group 812. In this simple example, the recommended parameters include a recommended distribution channel and a recommended message content for each group 812. For group 812 A, the messaging campaign engine 350 generates recommended parameters to send a first message content using an email service 814. For group 812 B, the messaging campaign engine 350 generates recommended parameters to send the first message content using a text messaging service 816. For group 812 C, the messaging campaign engine 350 generates recommended parameters to send a second message content using a social media service 818. The recommended parameters may be provided in a single recommendation, or separate recommendations may be used to provide each set of recommended parameters, for example.

The example method 700 described above, which may be performed using the messaging campaign engine 350 of the e-commerce platform 100, enables a single messaging campaign to be subdivided into sub-campaigns (also referred to as nested campaigns) for particular recipient groups identified from the initial set of intended recipients. The example method 700 may provide recommended parameters (e.g., recommended distribution channels) that may better engage intended recipients (or groups), by determining and recommending campaign parameters that are more contextually relevant to the intended recipients (or groups).

The example method 700 may be used to generate and notify recommendations to a merchant or marketer, which the merchant or marketer may accept or reject (or even further modify the recommended parameters). In some examples, the disclosed method 700 may be useful to generate recommended parameters when the merchant or marketer does not provide a required campaign parameter (such as a distribution channel). For example, the disclosed method 700 may be used to better tailor default campaign parameters.

In some examples, the example method 700 may be provided as an optional or add-on service for a merchant or marketer, which may or may not require added premium fees for use. In some examples, an external marketer may use the example method 700 to supplement or complement the marketer's own external campaign generator.

Figure 9:
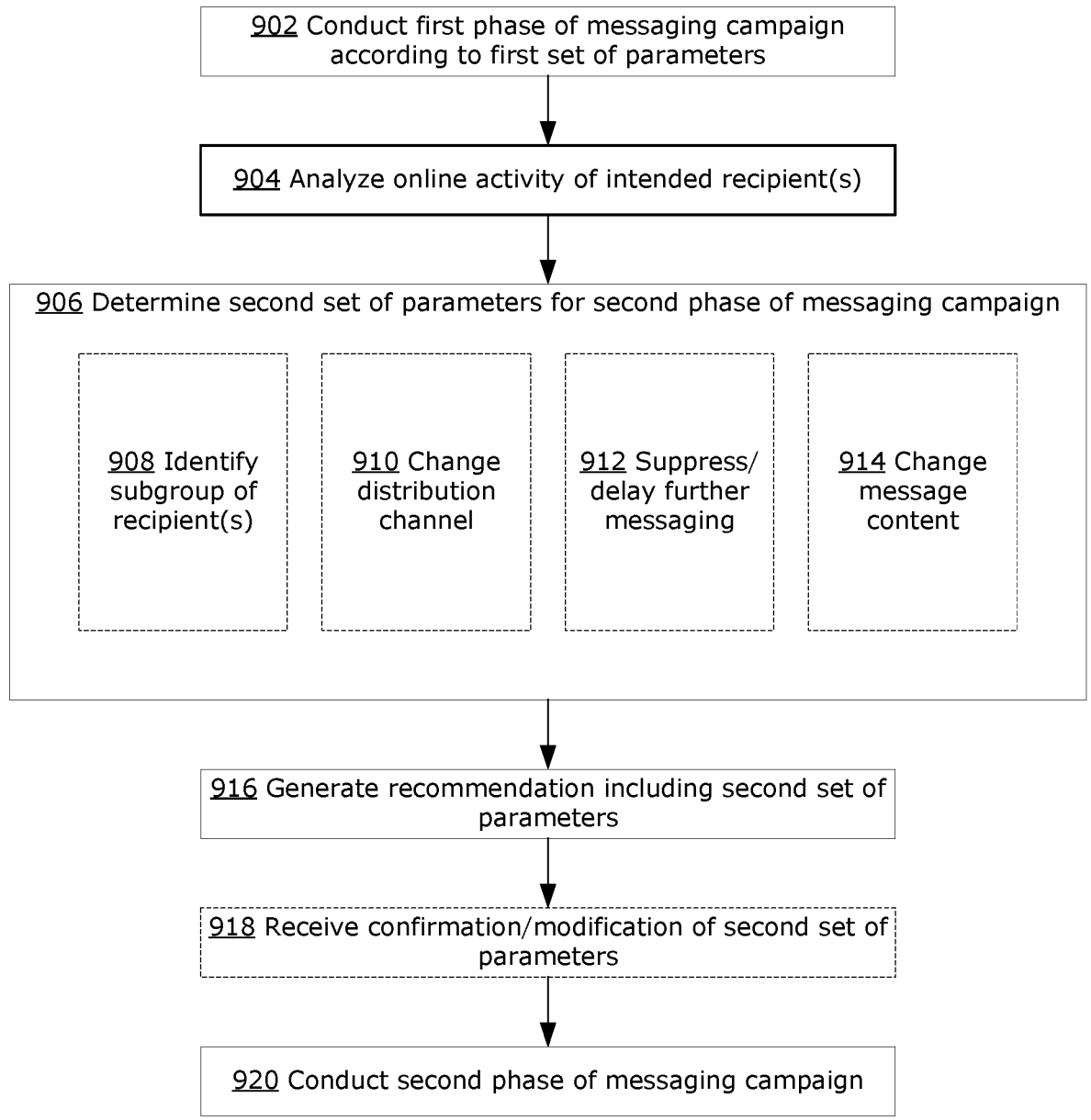
FIG. 9 is a flowchart illustrating another example method for generating a messaging campaign.

FIG. 9 is a flowchart illustrating another example method 900 for generating a messaging campaign associated with an online store. The method 900 may be implemented by the e-commerce platform 100 (e.g., using the messaging campaign engine 350 and/or the analytics facility 132). The method 900 may be implemented by a processing device executing instructions (e.g., at the core server 510 or the applications server 530). The method 900 may enable dynamic (e.g., real-time or near real-time) modification of an ongoing messaging campaign, for example in response to how recipient(s) respond to messages and/or in response to other online activity by recipient(s).

At 902, a first phase of the messaging campaign is conducted (e.g. campaign messages are sent to intended recipients) according to a first set of parameters. The first set of parameters may define a first message content, a first intended recipient group, a first distribution channel, etc. The first phase of the campaign may be conducted according to a campaign schedule. Although described as a "first" phase, it should be understood that the method 900 is not limited to starting with strictly the first phase of a messaging campaign. For example, if there are three phases defined for the messaging campaign, the method 900 at step 902 may instead start with the second of the three phases. Further, it should be understood that the method 900 may be used for a messaging campaign that is initially defined to have only one phase. That is, step 902 may be conducting the messaging campaign as a single phase, as originally defined, and subsequent steps of the method 900 generates an additional second phase of the messaging campaign dynamically.

At 904, online activity of the intended recipient(s) is analyzed. Analysis of online activity may be performed similarly to step 710 described above. For example, the analysis of online activity may be performed using the analytics facility 132. The analysis of online activity may also be performed using information provided by an external system. At 904, the analysis of online activity includes analysis of online activity that takes place during the ongoing messaging campaign.

The online activity is associated with a store, which may or may not be the store for which the messaging campaign is being conducted. In particular, the analysis of online activity may take into account online activity across different stores (e.g., across different online stores hosted by the e-commerce platform 100), and not necessarily limited to online activity associated with the particular store for which the messaging campaign is being conducted. Generally, online activity may be associated with any store having an online presence, including online-only stores, physical stores having an online presence (e.g., a store website), and may include stores that are not hosted by the e-commerce platform 100.

The analysis of online activity includes associating online activity with a group of intended recipients and/or individual intended recipient(s) (who may be part of a defined group). The analysis may be generalized analysis (e.g., a statistical analysis of aggregate behavior of a group) and/or may be analysis of individual behavior (e.g., where permission has been granted by an individual).

Information extracted from such analysis may be maintained internal to the e-commerce platform 100 and may not be shared with merchants, customers, or external users (e.g., in order to ensure privacy and security). In some examples, information from such analysis may be extracted using a machine-learning system. If a machine-learning system is used, the extraction of analytics may be performed in a hidden layer of the machine-learning system (i.e., not part of the output provided by the machine-learning system), such that such analytics is not explicitly exposed even within the e-commerce platform 100.

Similarly to that described for step 710 above, the online activity that is analyzed may include, for example, a page view event, an offering selection event, a purchase transaction event, a product search event, an offering return event, a page share event (e.g., sharing over a social network or other online channel), a virtual shopping cart event (e.g., an addition of an offering to the virtual shopping cart, or removal of an offering from the virtual shopping cart), a purchase abandonment event (e.g., starting a purchase transaction (e.g., beginning checkout of virtual shopping cart) without completing the purchase transaction), and/or a product review event, among other possibilities. In particular, analysis may include determining online activity associated with purchase of an offering associated with the messaging campaign.

At 906, a second set of parameters is determined for conducting a second phase of the messaging campaign. The determination of the second set of parameters is based on the analysis of online activity at step 904. The second set of parameters includes a change to at least one initially defined campaign parameter. For example, the second set of parameters may include a change to the first set of parameters (which were used to conduct the first phase of the campaign), or the second set of parameters may include a change to the parameters that were initially defined for the second phase of the campaign.

The online activity analyzed at step 904 may have a temporal alignment with the first phase of the messaging campaign. By "temporal alignment", it is meant that the online activity occurs during, or shortly after (e.g., within a predetermined time interval of) the first phase of the campaign. The temporal alignment (or temporal proximity) of the online activity with the first phase of the campaign may or may not be considered a correlation between the online activity and the first phase of the campaign. Even if the online activity is not considered to be correlated with the first phase of the campaign (e.g., if the online activity is viewing a website of a different online store unrelated to the campaign), nonetheless such online activity may be taken into account in determining the second set of parameters.

The determination of the second set of parameters may be based on predefined rules (which may be developed based on historical customer behavior) and/or using a machine-learning system.

A simple example of a set of predefined rules that may be used is: i) if within one month of the first phase of the campaign, the intended recipient has visited the online store associated with the campaign, then in the second phase of the campaign a second message should be sent to the intended recipient within one week of the visit; ii) if the intended recipient has not visited the online store within one month of the first phase of the campaign, then in the second phase of the campaign the second message should be sent at one month and should include a discount code.

A machine-learning system may be used in addition or instead of predefined rules. The machine-learning system (which may be implemented by the messaging campaign engine 350) can identify more sophisticated behavior patterns, based on historical messaging campaigns (e.g., as stored in defined campaign parameters 356) and historical engagement scores (e.g., stored in engagement metrics 358) for example. The machine-learning system may output one or more models, which may be specific to different groups (e.g., based on different demographics) and/or specific to different categories of merchant offerings, as the basis for determining the second set of parameters.

Determining the second set of campaign parameters may include optional steps 908-914 described below. Steps 908-914 may be used in combination for determining the second set of campaign parameters.

Optionally, at 908, a subgroup of recipient(s) may be identified from the first group. The subgroup may be identified from the first group based on, for example, the online activity of certain members of the first group. For example, if certain members of the first group have viewed the website of the online store associated with the campaign, those members may be identified as a subgroup for which a different message should be communicated in the second phase than the message that is communicated to other members (who did not view the website) of the first group.

In some examples, the subgroup may be considered a second recipient group separate from and non-overlapping with the first group. Specific recipients may be reassigned from the first group to the second group, to enable more accurate analysis of future online activity. It may be useful for the identified subgroup to be separated from and non-overlapping with the original group, to avoid overlapping sub-campaigns, so that an intended recipient is not overwhelmed with multiple messages from the same messaging campaign. In other examples, it may be useful to allow a subgroup to overlapping with the group, meaning that intended recipients who are members of the identified subgroup may still be considered a member of the original group. Overlapping subgroups may be useful in situations where it would be desirable to send multiple messages to the same intended recipient within the second phase of the campaign (e.g., over different distribution channels) to increase exposure.

In some examples, the second phase of the campaign may be conducted only for the identified subgroup, and the first phase may continue to be conducted with a remainder of the first group. In other examples, the second phase of the campaign may be conducted for the identified subgroup using the second set of parameters, and a different third set of parameters may be used to conduct the second phase for the remainder of the first group.

Optionally, at 910, the second set of parameters may include a change to the distribution channel. For example, if the analysis of the online activity shows activity related to a second distribution channel that is different from the distribution channel used for the first phase of the campaign, the second set of parameters may change the distribution channel to match the distribution channel that shows greater activity. For example, if the first phase of the campaign involved sending messages via an email service, analysis of online activity may show that most (or all) of the group are active on social media. Accordingly, the second set of parameters may change the distribution channel to send messages in the second phase of the campaign via social media.

Optionally, at 912, the second set of parameters may include changing the messaging schedule and/or excluding a particular subgroup so as to suppress/delay further messaging in the second phase of the campaign. For example, analysis of online activity may indicate that one or more intended recipients (or a subgroup) has made an online purchase (whether at the online store associated with the campaign or at a different store) of the offering that was marketed by the first phase of the campaign. Accordingly, the second phase of the campaign may exclude those recipients (or subgroup) or may suppress messaging so that the recipients (or subgroup) are not messaged again for an offering they have already purchased.

Optionally, at 914, the second set of parameters may include changing the message content. This may include adding/changing/removing an incentive from the message content, changing the format (e.g., visual, audio, textual, etc.) of the message content, or changing the offering promoted in the message content, among other possibilities. For example, if analysis of online activity shows that an intended recipient (or subgroup of intended recipients) mostly views online reviews having a video component, then the message content in the second phase may be changed to include a video. In another example, if analysis of online activity shows that an intended recipient (or subgroup) has made an online purchase of a first offering promoted in the first phase of the campaign, then the message content in the second phase may be changed to promote a second offering that is related to the first offering.

In some examples, the step 914 may be complementary to the step 912, by suppressing a message originally scheduled for the second phase and instead substituting a different message for the second phase.

In some examples, a change in message content may require the merchant or marketer to provide different possible content ahead of time (e.g., the messaging campaign engine 350 may require the merchant or marketer to provide a list of offerings to be promoted, in order to importance). In some examples, the merchant or marketer may be provided an option to supply different message content when a recommendation is generated (at step 916 below). In some examples, the messaging campaign engine 350 may automatically supply different message content based on, for example, predefined templates.

Other changes that may be made by the second set of parameters include a change in distribution channel, a change in message timing, a change in number of messages, or a change in incentive, among other possibilities.

At 916, a recommendation is generated including the recommended second set of parameters for the second phase of the campaign. Where a subgroup of intended recipients has been identified (e.g., at optional step 908), information about the identified subgroup may be included in the recommendation.

For privacy reasons, the recommendation that is provided to the merchant or marketer may omit identifying information about individual recipients. For example, if the recommended campaign parameter has identified individuals A, B and C as belonging to a subgroup for which messages should be communicated via distribution channel Y in the second phase, the merchant or marketer may only be notified that it is recommended to change to distribution channel Y for "some" intended recipients.

In some examples, the recommendation may be provided to the merchant or marketer in the form of a notification (e.g., via the user interface), and may offer an option to accept or reject the recommendation. If the option to accept or reject is provided, the recommendation may also include a predicted success rate or historical success rate associated with certain recommended parameter(s) to motivate the merchant or marketer to accept the recommended parameter (s). In some examples, the recommendation may require the merchant or marketer to provide information (e.g., different messaging content) in order to conduct the second phase according to the second set of parameters. In other examples, the recommendation may be automatically implemented without providing an option to reject the recommendation. In some examples, the recommendation may not be explicitly provided to the merchant or marketer, and may be automatically implemented without explicit notification to the merchant or marketer.

Optionally, at 918, if an option to accept or reject the recommendation was provided, a confirmation or modification of campaign parameters may be received (e.g., via a user interface).

At 920, the second phase of the messaging campaign is conducted (e.g. campaign messages are sent to the intended recipients) using the campaign parameters (e.g., using the second set of parameters if accepted). In some examples, the messaging campaign is conducted by the messaging campaign engine 350. In other examples, the messaging campaign engine 350 may output the campaign parameters to enable the messaging campaign to be conducted by an external system. For example, a marketer may use the messaging campaign engine 350, as a service provided by the e-commerce platform 100, to dynamically tailor a campaign that is conducted using the marketer's own external campaign system.

Figure 10A:
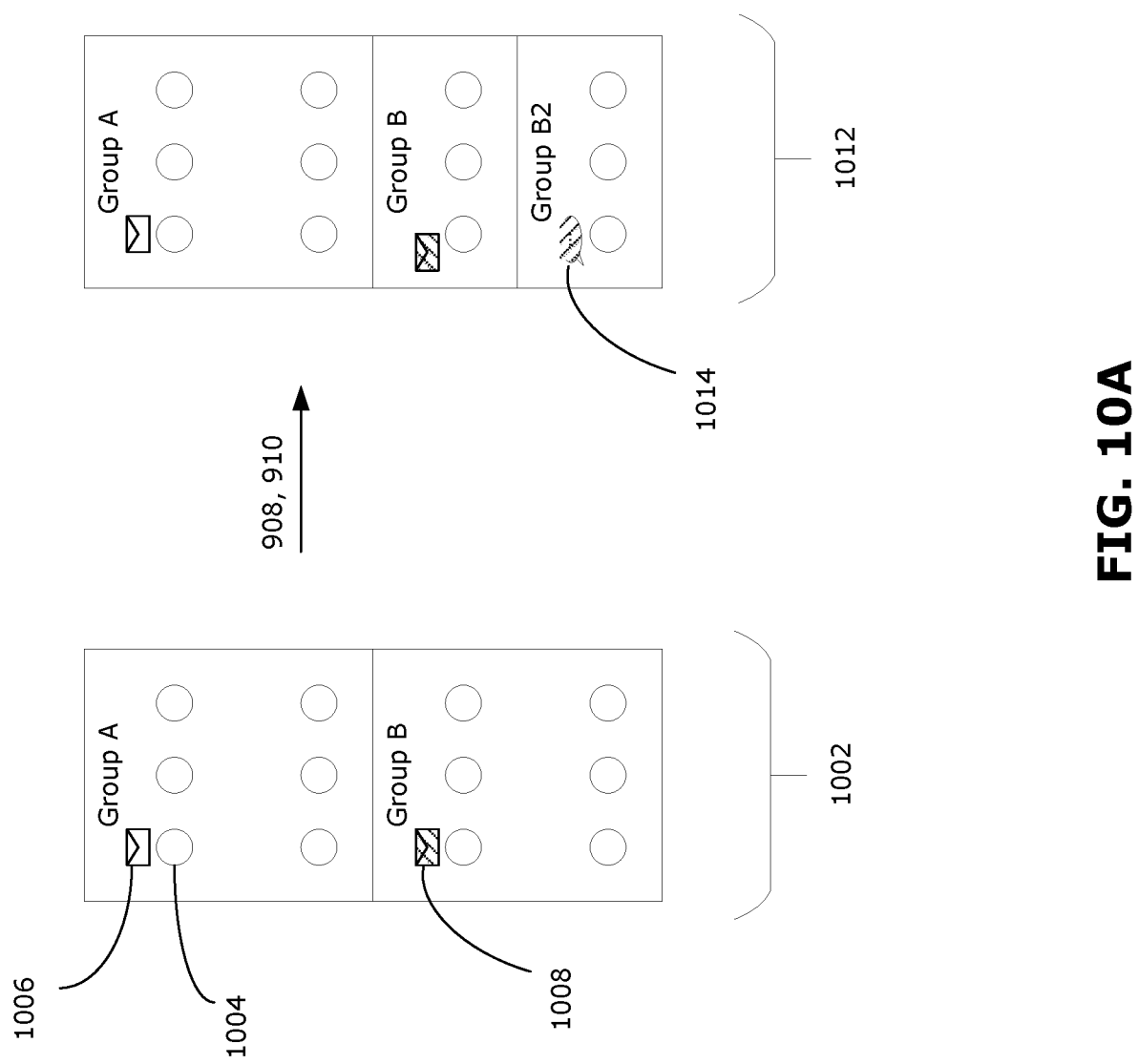
FIGS. 10A and 10B are schematic illustrations of simplified examples of aspects of the method of FIG. 9.
Figure 10B:
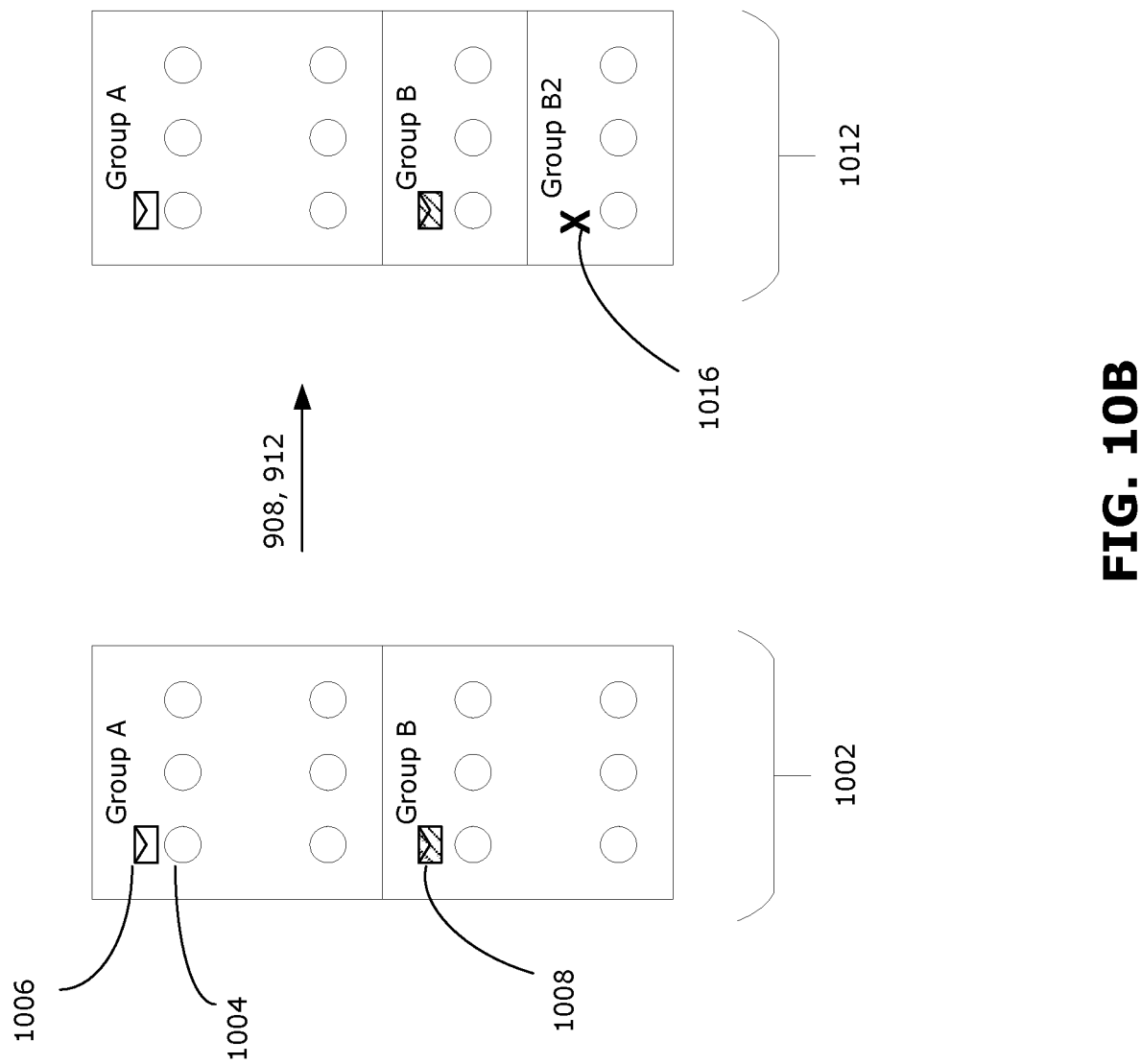

FIGS. 10A and 10B schematically illustrate simplified examples of aspects of the method 900, which may be carried out by the messaging campaign engine 350. In both of these examples, a first phase 1002 of the messaging campaign has been conducted with a first set of campaign parameters. The first phase 1002 includes sending messages to group A and group B (which comprise individual intended recipients 1004, who may or may not be explicitly defined in the first set of parameters). In the first phase 1002, a first email message 1006 is sent to group A, and a second email message 1008 (i.e., having different message content from the first email message 1006) is sent to group B.

In FIG. 10A, a second set of recommended campaign parameters are determined for the second phase 1012 of the campaign, including step 908 to identify subgroup of recipients from the initial groups, and step 910 to determine a recommended change in distribution channel. In this example, subgroup B2 has been identified from initial group B. For example, the group B2 may have been determined based on online activity of members of group B, such as being active on a social media service. Using step 910, a change to the distribution channel for subgroup B2 is determined. In this simple example, on the basis of subgroup B2 being active on the social media service, the second set of recommended campaign parameters include a change from distribution via email to distribution via social media 1014. The second set of recommended campaign parameters for conducting the second phase 1012, in this simple example, provides recommended changes to the campaign parameters for the group B, including identification of new subgroup B2, and a change in the distribution channel for subgroup B2.

In FIG. 10B, a second set of recommended campaign parameters are determined for the second phase 1012 of the campaign, including step 908 to identify subgroup of recipients from the initial groups, and step 912 to suppress or delay the message in the second phase 1012. In this example, subgroup B2 has been identified from initial group B. For example, the group B2 may have been determined based on online activity of members of group B, such as having made an online purchase of the offering promoted in the first phase 1002. Using step 912, an exclusion of subgroup B2 or a suppression of further messages for subgroup B2 in the second phase 1012 is determined. In this simple example, on the basis of subgroup B2 having already purchased the promoted offering, the second set of recommended campaign parameters include excluding subgroup B2 or suppressing further messages 1016 to subgroup B2 in the second phase. The second set of recommended campaign parameters for conducting the second phase 1012, in this simple example, provides recommended changes to the campaign parameters for the group B, including identification of new subgroup B2, and an exclusion of subgroup B2 from group B or a suppression of further messages to the subgroup B2.

The example method 900 described above, which may be performed using the messaging campaign engine 350 of the e-commerce platform 100, enables dynamic (e.g., real-time or near real-time) adjusting of a messaging campaign, based on real-time monitoring and analysis of online activity of intended recipient(s) (or group(s) of intended recipient(s)). The example method 900 may provide recommendations that may better engage intended recipients (or groups), by determining and recommending campaign parameters over the duration of the messaging campaign that are relevant, based on temporally aligned online activity of the intended recipients (or groups).

The example method 900 may provide recommended parameters that may better engage intended recipients (or groups) over the lifetime of a messaging campaign, by dynamically adjusting the campaign parameters over multiple phases of the campaign.

In some examples, the example method 900 may be provided as an optional or add-on service for a merchant or marketer, which may or may not require added premium fees for use. In some examples, an external marketer may use the example method 900 to monitor and adjust a campaign conducted by the marketer's own external campaign generator.

In some examples, the example methods 700 and 900 may be used together to conduct a single messaging campaign. For example, the method 700 may first be used to generate a first set of campaign parameters and conduct the first phase of a messaging campaign over multiple distribution channels, then the method 900 may be used to dynamically generate a second set of campaign parameters for conducting the second phase of the messaging campaign, for example tailoring the message by changing the distribution channel for some subgroup of intended recipients.

In various examples discussed herein, methods and systems are provided for generating and conducting a messaging campaign. Instead of relying on a merchant or marketer to select the campaign parameters (e.g., select a distribution channel) which are fixed over the duration of the campaign, aspects of the present disclosure enable a campaign to be divided into sub-campaigns that are better directed towards certain recipients (or recipient groups). Recipients can be dynamically grouped into specific subgroups depending on their online activity during the timeframe of the campaign.

The disclosed methods and systems enable analysis of online activity, not limited to any specific messaging campaign, to determine recommendations for tailoring a proposed and/or ongoing messaging campaign. Further, such analysis may be anonymized and/or categorized based on recipient characteristics, offering categories, store categories, etc.

Using examples of the disclosed methods and systems, the e-commerce platform 100 may enable a merchant or marketer to leverage analytics generated from multiple historical campaigns. This may be of particular value to less-experienced merchants or marketers. The recommendations provided by the e-commerce platform 100 may include information about intended recipient groups, online activity and/or historical success rates, etc. which may help to educate the merchant or marketer for designing future messaging campaigns.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

All referenced documents are hereby incorporated by reference in their entireties.

The invention claimed is:

1. A system comprising:
a processor in communication with a storage, the processor configured to execute instructions in the storage to cause the system to:
conduct a messaging campaign over at least a first phase and a second phase in accordance with initially defined parameters for the messaging campaign, the first and second phases being separated temporally based on a schedule included in the initially defined parameters, the initially defined parameters including a first set of parameters for conducting the first phase and a second set of parameters for conducting the second phase, wherein the processor is configured to execute the instructions for conducting the messaging campaign to cause the system to:
conduct the first phase of the messaging campaign in accordance with the first set of parameters, the first set of parameters defining at least a first group of intended recipients of a first message and a respective first distribution channel;
responsive to conducting the first phase of the messaging campaign, track online activity associated with one or more members of the first group, wherein the online activity occurs in temporal alignment with the first phase and is associated with a store;
based on analysis of the tracked online activity associated with one or more members of the first group, identify the one or more members as belonging to a subgroup of the first group and change the second set of parameters for delivering a second message to the one or more members;
prior to conducting the second phase of the messaging campaign, generate a recommendation to conduct the second phase of the messaging campaign for the one or more members using the changed second set of parameters;
conduct the second phase of the messaging campaign according to the changed second set of parameters for the subgroup; and
conduct the second phase of the messaging campaign for a remainder of the first group according to the second set of parameters included in the initially defined parameters.

2. The system of claim 1, wherein the analysis of the tracked online activity comprises analysis of at least one of: online activity associated with a first store associated with the messaging campaign, or online activity associated with a second store not associated with the messaging campaign.

3. The system of claim 1, wherein the tracked online activity is associated with a purchase of a first offering associated with the messaging campaign.

4. The system of claim 3, wherein the processor is configured to execute instructions to cause the system to:
change the second set of parameters to suppress promotion of the first offering to the one or more members in the second phase of the messaging campaign.

5. The system of claim 3, wherein the processor is configured to execute instructions to cause the system to:
change the second set of parameters to promote a second offering, that is related to the first offering, to the one or more members in the second phase of the messaging campaign.

6. The system of claim 1, wherein the second set of parameters included in the initially defined parameters define a second group of intended recipients, and wherein the processor is configured to execute instructions to cause the system to change the second set of parameters to reassign the one or more members to the second group.

7. The system of claim 1, wherein the tracked online activity comprises at least one of:
a page view event;
a purchase transaction event;
an offering search event; or
a product review event.

8. The system of claim 1, wherein the change to the second set of parameters comprises at least one of:
a change in distribution channel;
a change in message content;
a change in message timing;
a change in number of messages; or
a change in incentive.

9. The system of claim 1, wherein the processor is configured to execute instructions to cause the system to:
associate the tracked online activity with a second distribution channel; and
change the second set of parameters to deliver the second message using the second distribution channel.

10. The system of claim 1, wherein the processor is configured to execute instructions to cause the system to:
automatically implement the recommendation to conduct the second phase of the messaging campaign for the one or more members using the changed second set of parameters.

11. A computer-implemented method comprising:
conducting, by a computing platform, a messaging campaign over at least a first phase and a second phase in accordance with initially defined parameters for the messaging campaign, the first and second phases being separated temporally based on a schedule included in the initially defined parameters, the initially defined parameters including a first set of parameters for conducting the first phase and a second set of parameters for conducting the second phase, wherein conducting the messaging campaign comprises:
conducting the first phase of the messaging campaign in accordance with the first set of parameters, the first set of parameters defining at least a first group of intended recipients of a first message and a respective first distribution channel;
responsive to conducting the first phase of the messaging campaign, tracking online activity associated with one or more members of the first group, wherein the online activity occurs in temporal alignment with the first phase and is associated with a store;

based on analysis of the tracked online activity associated with one or more members of the first group, identifying the one or more members as belonging to a subgroup of the first group and changing the second set of parameters for delivering a second message to the one or more members;

prior to conducting the second phase of the messaging campaign, generating a recommendation to conduct the second phase of the messaging campaign for the one or more members using the changed second set of parameters;

conducting the second phase of the messaging campaign according to the changed second set of parameters for the subgroup; and conducting the second phase of the messaging campaign for a remainder of the first group according to the second set of parameters included in the initially defined parameters.

12. The computer-implemented method of claim 11, wherein the analysis of the tracked online activity comprises analysis of at least one of: online activity associated with a first store associated with the messaging campaign, or online activity associated with a second store not associated with the messaging campaign.

13. The computer-implemented method of claim 11, wherein the tracked online activity is associated with a purchase of a first offering associated with the messaging campaign, and the second set of parameters is changed to suppress promotion of the first offering to the one or more members in the second phase of the messaging campaign.

14. The computer-implemented method of claim 11, wherein the tracked online activity is associated with a purchase of a first offering associated with the messaging campaign, and the second set of parameters is changed to promote a second offering, that is related to the first offering, to the one or more members in the second phase of the messaging campaign.

15. The computer-implemented method of claim 11, wherein the tracked online activity comprises at least one of:
a page view event;
a purchase transaction event;
an offering search event; or
a product review event.

16. The computer-implemented method of claim 11, further comprising:
associating the tracked online activity with a second distribution channel; and
changing the second set of parameters to deliver the second message using the second distribution channel.

17. The computer-implemented method of claim 11, further comprising:
automatically implementing the recommendation to conduct the second phase of the messaging campaign for the one or more members using the changed second set of parameters.

18. A non-transitory computer readable medium having computer-executable instructions stored thereon, wherein the instructions, when executed by a processor of a system, causes the system to:

conduct a messaging campaign over at least a first phase and a second phase in accordance with initially defined parameters for the messaging campaign, the first and second phases being separated temporally based on a schedule included in the initially defined parameters, the initially defined parameters including a first set of parameters for conducting the first phase and a second set of parameters for conducting the second phase, wherein the instructions for conducting the messaging campaign cause the system to:

conduct the first phase of the messaging campaign in accordance with the first set of parameters, the first set of parameters defining at least a first group of intended recipients of a first message and a respective first distribution channel;

responsive to conducting the first phase of the messaging campaign, track online activity associated with one or more members of the first group, wherein the online activity occurs in temporal alignment with the first phase and is associated with a store;

based on analysis of the tracked online activity associated with one or more members of the first group, identifying the one or more members as belonging to a subgroup of the first group and change the second set of parameters for delivering a second message to the one or more members;

prior to conducting the second phase of the messaging campaign, generate a recommendation to conduct the second phase of the messaging campaign for the one or more members using the changed second set of parameters;

conduct the second phase of the messaging campaign according to the changed second set of parameters for the subgroup; and conduct the second phase of the messaging campaign for a remainder of the first group according to the second set of parameters included in the initially defined parameters.

* * * * *